(12) United States Patent
Kawakishi et al.

(10) Patent No.: US 10,057,883 B2
(45) Date of Patent: Aug. 21, 2018

(54) WIRELESS COMMUNICATION SYSTEM, CONTROL APPARATUS, AND WIRELESS TERMINAL

(71) Applicant: FUJITSU LIMITED, Kawasaki-shi, Kanagawa (JP)

(72) Inventors: Masanobu Kawakishi, Sapporo (JP); Shinji Yamauchi, Ebetsu (JP); Takeshi Uchiumi, Sapporo (JP); Yoshihiro Ando, Sapporo (JP); Takahisa Ishikawa, Sapporo (JP); Takao Ohta, Sapporo (JP); Yasuo Nakajima, Sapporo (JP)

(73) Assignee: FUJITSU LIMITED, Kawasaki (JP)

( * ) Notice: Subject to any disclaimer, the term of this patent is extended or adjusted under 35 U.S.C. 154(b) by 184 days.

(21) Appl. No.: 15/165,286

(22) Filed: May 26, 2016

(65) Prior Publication Data
US 2016/0360508 A1    Dec. 8, 2016

(30) Foreign Application Priority Data
Jun. 2, 2015  (JP) .................................. 2015-112628

(51) Int. Cl.
*H04W 72/04* (2009.01)
*H04W 76/04* (2009.01)
(Continued)

(52) U.S. Cl.
CPC ......... *H04W 72/04* (2013.01); *H04W 76/045* (2013.01); *H04W 76/25* (2018.02);
(Continued)

(58) Field of Classification Search
None
See application file for complete search history.

(56) References Cited

U.S. PATENT DOCUMENTS

| | | | |
|---|---|---|---|
| 2009/0022098 A1* | 1/2009 | Novak | H04L 1/14 370/329 |
| 2009/0172182 A1* | 7/2009 | Yoon | H04L 65/80 709/231 |

(Continued)

FOREIGN PATENT DOCUMENTS

| | | |
|---|---|---|
| JP | 2013-046274 A | 3/2013 |
| JP | 2013-118663 A | 6/2013 |
| JP | 2013-211747 A | 10/2013 |

*Primary Examiner* — Ayaz Sheikh
*Assistant Examiner* — Faiyazkhan Ghafoerkhan
(74) *Attorney, Agent, or Firm* — Arent Fox LLP

(57) ABSTRACT

A wireless communication system including: a wireless terminal configured to: establish each of at least one session between the wireless terminal and each of at least one server via a wireless communication with a wireless base station, and transmit each of at least one specified signal for maintaining the established at least one session using a periodic radio resource allocated to the wireless terminal, and a control apparatus including a processor configured to: obtain each of at least one time-out time set for each of the at least one session, determine a resource periodicity of the periodic radio resource based on the shortest time-out time among the at least one time-out time, and determine each of at least one signal periodicity for transmitting each of the at least one specified signal based on the determined resource periodicity.

6 Claims, 46 Drawing Sheets

```
┌─ 3700 ─────────────────────────────────────────┐
│                                                 │
│  REFERENCE POINT IN TIME: 2015/01/01 00:00:00:000
│  SCHEDULING RESOLUTION: 1 SECOND                │
│  SCHEDULING UNIT: 60 SECONDS                    │
│  STARTING BLOCK: 0                              │
│  PERIODICITY VALUE: 3 SECONDS                   │
│  CORRECTION VALUE: NONE                         │
│  COMMUNICATION WITH SERVER #1 (REPORT UNIT 1)   │
│  COMMUNICATION WITH SERVER #2 (REPORT UNIT 3)   │
│  COMMUNICATION WITH SERVER #3 (REPORT UNIT 2)   │
│  COMMUNICATION WITH SERVER #4 (REPORT UNIT 6)   │
│                                                 │
└─────────────────────────────────────────────────┘
```

(51) Int. Cl.
  *H04W 76/25* (2018.01)
  *H04L 29/06* (2006.01)
  *H04W 76/15* (2018.01)
  *H04W 76/02* (2009.01)
(52) U.S. Cl.
  CPC ....... *H04L 65/1069* (2013.01); *H04W 76/025* (2013.01); *H04W 76/15* (2018.02)

(56) References Cited

U.S. PATENT DOCUMENTS

| | | | | |
|---|---|---|---|---|
| 2009/0252124 A1* | 10/2009 | Yeo | ................... | H04W 72/1252 370/336 |
| 2009/0254664 A1* | 10/2009 | Wada | ..................... | H04L 67/14 709/227 |
| 2011/0164587 A1* | 7/2011 | Seo | ...................... | H04L 1/1671 370/329 |
| 2012/0113905 A1* | 5/2012 | Anderson | ........... | H04W 76/068 370/329 |
| 2013/0003526 A1* | 1/2013 | Novak | ...................... | H04L 1/14 370/216 |
| 2013/0010729 A1* | 1/2013 | Novak | ...................... | H04L 1/14 370/329 |
| 2013/0095768 A1* | 4/2013 | Sinha | ................ | H04W 52/0235 455/70 |
| 2013/0185421 A1* | 7/2013 | Yang | .................... | H04L 65/1066 709/224 |
| 2013/0258945 A1* | 10/2013 | Tomita | ................ | H04W 76/045 370/328 |
| 2014/0016554 A1* | 1/2014 | Lee | ..................... | H04W 76/045 370/328 |
| 2014/0056313 A1* | 2/2014 | Wada | ..................... | H04L 63/02 370/463 |
| 2016/0212760 A1* | 7/2016 | Iwai | .................. | H04W 28/0247 |
| 2018/0007534 A1* | 1/2018 | Thakolsri | ............... | H04W 8/06 |

* cited by examiner

FIG. 6

| 600 | | | |
|---|---|---|---|
| UE #1<br>(EVERY IP ADDRESS OF UE) | PERIODICITY VALUE | 15 SECONDS | |
| | TIMER #1<br>(EVERY SESSION) | SERVER IDENTIFIER | 0x00000001 |
| | | SESSION IDENTIFIER | 0x00000001 |
| | | ACTUAL TIMER VALUE | 15 SECONDS |
| | | REPORT UNIT | 1 |
| | TIMER #2 | SERVER IDENTIFIER | 0x00000002 |
| | | SESSION IDENTIFIER | 0x00000001 |
| | | ACTUAL TIMER VALUE | 33 SECONDS |
| | | REPORT UNIT | 2 |
| ⋮ | ⋮ | ⋮ | ⋮ |
| UE#n | | | |

FIG. 7

| 600 | | | |
|---|---|---|---|
| UE #1 (EVERY IP ADDRESS OF UE) | PERIODICITY VALUE | 7 SECONDS | |
| | TIMER #1 (EVERY SESSION) | SERVER IDENTIFIER | 0x00000001 |
| | | SESSION IDENTIFIER | 0x00000001 |
| | | ACTUAL TIMER VALUE | 15 SECONDS |
| | | REPORT UNIT | 2 |
| | TIMER #2 | SERVER IDENTIFIER | 0x00000002 |
| | | SESSION IDENTIFIER | 0x00000001 |
| | | ACTUAL TIMER VALUE | 33 SECONDS |
| | | REPORT UNIT | 4 |
| | TIMER #3 | SERVER IDENTIFIER | 0x00000003 |
| | | SESSION IDENTIFIER | 0x00000001 |
| | | ACTUAL TIMER VALUE | 7 SECONDS |
| | | REPORT UNIT | 1 |
| ⋮ | ⋮ | ⋮ | ⋮ |
| UE#n | | | |

FIG. 8

| | 0 | 1 | 2 | 3 | 4 | 5 | 6 | 7 | 8 | 9 |
|---|---|---|---|---|---|---|---|---|---|---|
| 0 | | | | | | | | ○ | | |
| 10 | | | | | ○ | ○ | | | | |
| 20 | | ○ | | | | | | | ○ | |
| 30 | ○ | | | ○ | | ○ | | | | |
| 40 | | | ○ | | | ○ | | | | ○ |
| 50 | | | | | | | ○ | | | |
| 60 | ○ | | | ○ | | | ○ | | | |
| 70 | ○ | | | | | ○ | | ○ | | |
| 80 | | | | | ○ | | | | | |
| 90 | ○ | ○ | | | | | | | ○ | ○ |
| 100 | | | | | ○ | | | | | |

FIG. 9

|     | 0 | 1 | 2 | 3 | 4 | 5 | 6 | 7 | 8 | 9 |
|-----|---|---|---|---|---|---|---|---|---|---|
| 0   | ○ |   |   |   |   |   |   | ○ |   |   |
| 10  |   |   |   |   | ○ |   |   |   |   |   |
| 20  |   | ○ |   |   |   |   |   |   | ○ |   |
| 30  |   |   |   |   |   | ○ |   |   |   |   |
| 40  |   |   | ○ |   |   |   |   |   |   | ○ |
| 50  |   |   |   |   |   |   | ○ |   |   |   |
| 60  |   |   |   | ○ |   |   |   |   |   |   |
| 70  | ○ |   |   |   |   |   |   | ○ |   |   |
| 80  |   |   |   |   | ○ |   |   |   |   |   |
| 90  |   | ○ |   |   |   |   |   |   | ○ |   |
| 100 |   |   |   |   |   | ○ |   |   |   |   |

FIG. 12

(UNIT IS ONE SECOND) 1100

1110
0 PLANE

|    | 0    | 1    | 2    | 3 | 4    | 5    | 6    | 7    | 8    | 9    |
|----|------|------|------|---|------|------|------|------|------|------|
| 0  | UE#1 |      |      |   |      |      |      | UE#1 |      |      |
| 10 |      |      |      |   | UE#1 |      |      |      |      |      |
| 20 |      | UE#1 |      |   |      |      |      |      | UE#1 |      |
| 30 |      |      |      |   |      | UE#1 |      |      |      |      |
| 40 |      |      | UE#1 |   |      |      |      |      |      | UE#1 |
| 50 |      |      |      |   |      |      | UE#1 |      |      |      |

FIG. 13

| REFERENCE POINT IN TIME | 2015/01/01 00:00:00:000 | |
|---|---|---|
| SCHEDULING RESOLUTION | 1 SECOND | |
| SCHEDULING UNIT | 60 SECONDS | |
| STARTING BLOCK | 0 | |
| PERIODICITY VALUE | 7 SECONDS | |
| TIMER (EVERY SESSION) | SERVER IDENTIFIER | 0x00000001 |
| | SESSION IDENTIFIER | 0x00000001 |
| | ACTUAL TIMER VALUE | 15 SECONDS |
| | REPORT UNIT | 2 |
| TIMER#2 | SERVER IDENTIFIER | 0x00000002 |
| | SESSION IDENTIFIER | 0x00000001 |
| | ACTUAL TIMER VALUE | 33 SECONDS |
| | REPORT UNIT | 4 |
| TIMER#3 | SERVER IDENTIFIER | 0x00000003 |
| | SESSION IDENTIFIER | 0x00000001 |
| | ACTUAL TIMER VALUE | 7 SECONDS |
| | REPORT UNIT | 1 |

FIG. 14

| 1400 | | | |
|---|---|---|---|
| UE#2 | PERIDOCITY VALUE | 6 SECONDS | |
| | TIMER (EVERY SESSION) | SERVER IDENTIFIER | 0x00000001 |
| | | SESSION IDENTIFIER | 0x00000002 |
| | | ACTUAL TIMER VALUE | 6 SECONDS |
| | | REPORT UNIT | 1 |
| | TIMER#2 | SERVER IDENTIFIER | 0x00000002 |
| | | SESSION IDENTIFIER | 0x00000002 |
| | | ACTUAL TIMER VALUE | 9 SECONDS |
| | | REPORT UNIT | 1 |
| | TIMER#3 | SERVER IDENTIFIER | 0x00000003 |
| | | SESSION IDENTIFIER | 0x00000002 |
| | | ACTUAL TIMER VALUE | 20 SECONDS |
| | | REPORT UNIT | 3 |

FIG. 15

SCHEDULING MAP  1100

0 PLANE  1110   (UNIT IS ONE SECOND)

|    | 0 | 1 | 2 | 3 | 4 | 5 | 6 | 7 | 8 | 9 |
|----|---|---|---|---|---|---|---|---|---|---|
| 0  | UE#1 | UE#2 |  |  |  |  |  | UE#1 |  |  |
| 10 |  |  |  | UE#2 | UE#1 |  |  |  |  | UE#2 |
| 20 |  | UE#1 |  |  |  | UE#2 |  |  | UE#1 |  |
| 30 |  | UE#2 |  |  |  | UE#1 |  | UE#2 |  |  |
| 40 |  |  | UE#1 | UE#2 |  |  |  |  |  | UE#1 |
| 50 |  |  |  |  |  | UE#2 | UE#1 |  |  |  |

1 PLANE  1120   (UNIT IS ONE SECOND)

|    | 0 | 1 | 2 | 3 | 4 | 5 | 6 | 7 | 8 | 9 |
|----|---|---|---|---|---|---|---|---|---|---|
| 0  |  |  |  |  |  |  |  | UE#2 |  |  |
| 10 |  |  |  |  |  |  |  |  |  |  |
| 20 |  |  |  |  |  |  |  |  |  |  |
| 30 |  |  |  |  |  |  |  |  |  |  |
| 40 |  |  |  |  |  |  |  |  |  | UE#2 |
| 50 |  |  |  |  |  |  |  |  |  |  |

FIG. 16

SCHEDULING MAP 1100

0 PLANE 1110 1601

(UNIT IS ONE SECOND)

| | 0 | 1 | 2 | 3 | 4 | 5 | 6 | 7 | 8 | 9 |
|---|---|---|---|---|---|---|---|---|---|---|
| 0 | UE#1 | UE#2 | UE#3 | | UE#3 | | UE#3 | UE#1 | UE#3 | |
| 10 | UE#3 | | UE#3 | UE#2 | UE#1 | | UE#3 | | UE#3 | UE#2 |
| 20 | UE#3 | UE#1 | UE#3 | | UE#3 | UE#2 | UE#3 | | UE#1 | |
| 30 | UE#3 | UE#2 | UE#3 | | UE#3 | UE#1 | UE#3 | UE#2 | UE#3 | |
| 40 | UE#3 | | UE#1 | UE#2 | UE#3 | | UE#3 | | UE#3 | UE#1 |
| 50 | UE#3 | | UE#3 | | UE#3 | UE#2 | UE#1 | | UE#3 | |

1601

1 PLANE 1120

(UNIT IS ONE SECOND)

| | 0 | 1 | 2 | 3 | 4 | 5 | 6 | 7 | 8 | 9 |
|---|---|---|---|---|---|---|---|---|---|---|
| 0 | | | | | | | | UE#2 | | |
| 10 | | | | | UE#3 | | | | | |
| 20 | | | | | | | | | UE#3 | |
| 30 | | | | | | | | | | |
| 40 | | | UE#3 | | | | | | | UE#2 |
| 50 | | | | | | | UE#3 | | | |

FIG. 17

1100
SCHEDULING MAP 1110
0 PLANE  (UNIT IS ONE SECOND)

|    | 0    | 1    | 2    | 3    | 4    | 5    | 6    | 7    | 8    | 9    |
|----|------|------|------|------|------|------|------|------|------|------|
| 0  | UE#1 | UE#2 | UE#3 |      | UE#3 |      | UE#3 | UE#1 | UE#3 |      |
| 10 | UE#3 |      | UE#3 | UE#2 | UE#1 |      | UE#3 |      | UE#3 | UE#2 |
| 20 | UE#3 | UE#1 | UE#3 |      | UE#3 | UE#2 | UE#3 |      | UE#1 |      |
| 30 | UE#3 | UE#2 | UE#3 |      | UE#3 | UE#1 | UE#3 | UE#2 | UE#3 |      |
| 40 | UE#3 |      | UE#1 | UE#2 | UE#3 |      | UE#3 |      | UE#3 | UE#1 |
| 50 | UE#3 |      | UE#3 |      | UE#3 | UE#2 | UE#1 |      | UE#3 | UE#3 |

1701

1120
1 PLANE  (UNIT IS ONE SECOND)

|    | 0 | 1 | 2    | 3 | 4    | 5 | 6    | 7    | 8    | 9    |
|----|---|---|------|---|------|---|------|------|------|------|
| 0  |   |   |      |   |      |   |      | UE#2 |      |      |
| 10 |   |   |      |   | UE#3 |   |      |      |      |      |
| 20 |   |   |      |   |      |   |      |      | UE#3 |      |
| 30 |   |   |      |   |      |   |      |      |      |      |
| 40 |   |   | UE#3 |   |      |   |      |      |      | UE#2 |
| 50 |   |   |      |   |      |   | UE#3 |      |      |      |

FIG. 19

```
                ┌─1900
SCHEDULING MAP
      1910
            ┐                (UNIT IS ONE SECOND)
0 PLANE
              │  0  │ 1 │ 2 │ 3 │ 4 │ 5 │ 6 │ 7 │ 8 │ 9 │ 10 │
              │ 0+  │   │   │   │   │   │   │   │   │   │    │
              │ 11+ │   │   │   │   │   │   │   │   │   │    │
              │ 22+ │   │   │   │   │   │   │   │   │   │    │
              │ 33+ │   │   │   │   │   │   │   │   │   │    │
              │ 44+ │   │   │   │   │   │   │   │   │   │    │
              │ 55+ │   │   │   │   │   │   │   │   │   │    │
```

FIG. 21

1900 SCHEDULING MAP 1910 0 PLANE (UNIT IS ONE SECOND)

| | 0 | 1 | 2 | 3 | 4 | 5 | 6 | 7 | 8 | 9 | 10 |
|---|---|---|---|---|---|---|---|---|---|---|---|
| 0+ | UE#1 | UE#2 | UE#3 | UE#4 | UE#5 | UE#6 | UE#7 | UE#8 | UE#9 | UE#10 | |
| 11+ | UE#1 | | UE#3 | UE#4 | | UE#6 | UE#7 | | UE#9 | UE#10 | |
| 22+ | UE#1 | UE#2 | UE#3 | UE#4 | | UE#6 | UE#7 | | UE#9 | UE#10 | |
| 33+ | UE#1 | | UE#3 | UE#4 | UE#5 | UE#6 | UE#7 | | UE#9 | UE#10 | |
| 44+ | UE#1 | UE#2 | UE#3 | UE#4 | | UE#6 | UE#7 | UE#8 | UE#9 | UE#10 | |
| 55+ | UE#1 | | UE#3 | UE#4 | | UE#6 | UE#7 | | UE#9 | UE#10 | |

FIG. 22

SCHEDULING MAP 1900

0 PLANE 1910

(UNIT IS ONE SECOND)

|     | 0    | 1    | 2    | 3    | 4    | 5    | 6    | 7    | 8    | 9     | 10    |
|-----|------|------|------|------|------|------|------|------|------|-------|-------|
| 0+  | UE#1 | UE#2 | UE#3 | UE#4 | UE#5 | UE#6 | UE#7 | UE#8 | UE#9 | UE#10 | UE#11 |
| 11+ | UE#1 |      | UE#3 | UE#4 |      | UE#6 | UE#7 |      | UE#9 | UE#10 |       |
| 22+ | UE#1 | UE#2 | UE#3 | UE#4 |      | UE#6 | UE#7 |      | UE#9 | UE#10 |       |
| 33+ | UE#1 |      | UE#3 | UE#4 | UE#5 | UE#6 | UE#7 |      | UE#9 | UE#10 |       |
| 44+ | UE#1 | UE#2 | UE#3 | UE#4 |      | UE#6 | UE#7 | UE#8 | UE#9 | UE#10 |       |
| 55+ | UE#1 |      | UE#3 | UE#4 |      | UE#6 | UE#7 |      | UE#9 | UE#10 | UE#11 |

FIG. 23

| | | 0 | 1 | 2 | 3 | 4 | 5 | 6 | 7 | 8 | 9 | 10 |
|---|---|---|---|---|---|---|---|---|---|---|---|---|
| SCHEDULING MAP 1900<br>0 PLANE 1910 | | | | | | (UNIT IS ONE SECOND) | | | | | | |
| | 0+ | UE#1 | UE#2 | UE#3 | UE#4 | UE#5 | UE#6 | UE#7 | UE#8 | UE#9 | UE#10 | UE#11 |
| | 11+ | UE#1 | | UE#3 | UE#4 | | UE#6 | UE#7 | UE#12 | UE#9 | UE#10 | |
| | 22+ | UE#1 | UE#2 | UE#3 | UE#4 | | UE#6 | UE#7 | | UE#9 | UE#10 | |
| | 33+ | UE#1 | | UE#3 | UE#4 | UE#5 | UE#6 | UE#7 | | UE#9 | UE#10 | |
| | 44+ | UE#1 | UE#2 | UE#3 | UE#4 | | UE#6 | UE#7 | UE#8 | UE#9 | UE#10 | |
| | 55+ | UE#1 | | UE#3 | UE#4 | | UE#6 | UE#7 | UE#12 | UE#9 | UE#10 | UE#11 |

FIG. 24

SCHEDULING MAP 1900

0 PLANE 1910 (UNIT IS ONE SECOND)

| | 0 | 1 | 2 | 3 | 4 | 5 | 6 | 7 | 8 | 9 | 10 |
|---|---|---|---|---|---|---|---|---|---|---|---|
| 0+ | UE#1 | UE#2 | UE#3 | UE#4 | UE#5 | UE#6 | UE#7 | UE#8 | UE#9 | UE#10 | UE#11 |
| 11+ | UE#1 | | UE#3 | UE#4 | | UE#6 | UE#7 | UE#12 | UE#9 | UE#10 | |
| 22+ | UE#1 | UE#2 | UE#3 | UE#4 | | UE#6 | UE#7 | | UE#9 | UE#10 | |
| 33+ | UE#1 | | UE#3 | UE#4 | UE#5 | UE#6 | UE#7 | | UE#9 | UE#10 | |
| 44+ | UE#1 | UE#2 | UE#3 | UE#4 | | UE#6 | UE#7 | UE#8 | UE#9 | UE#10 | |
| 55+ | UE#1 | | UE#3 | UE#4 | | UE#6 | UE#7 | UE#12 | UE#9 | UE#10 | UE#11 |

1 PLANE 1920 (UNIT IS ONE SECOND)

| | 0 | 1 | 2 | 3 | 4 | 5 | 6 | 7 | 8 | 9 | 10 |
|---|---|---|---|---|---|---|---|---|---|---|---|
| 0+ | UE#13 | | | | | | | | | | |
| 11+ | | | | | | | | | | | |
| 22+ | | | | | | | | | | | |
| 33+ | | | | | | | | | | | |
| 44+ | UE#13 | | | | | | | | | | |
| 55+ | | | | | | | | | | | |

REFERENCE POINT IN TIME: 2015/01/01 00:00:00:000
SCHEDULING RESOLUTION: 1 SECOND
SCHEDULING UNIT: 60 SECONDS
STARTING BLOCK: 0
PERIODICITY VALUE: 3 SECONDS
CORRECTION VALUE: NONE
COMMUNICATION WITH SERVER #1 (REPORT UNIT 1)
COMMUNICATION WITH SERVER #2 (REPORT UNIT 3)

FIG. 28

```
┌─ 2800
│
│  REFERENCE POINT IN TIME: 2015/01/01 00:00:00:000
│  SCHEDULING RESOLUTION: 1 SECOND
│  SCHEDULING UNIT: 60 SECONDS
│  STARTING BLOCK: 0
│  PERIODICITY VALUE: 7 SECONDS
│  CORRECTION VALUE: NONE
│  COMMUNICATION WITH SERVER #3 (REPORT UNIT 1)
│  COMMUNICATION WITH SERVER #4 (REPORT UNIT 2)
```

FIG. 29

```
┌ 2900
REFERENCE POINT IN TIME: 2015/01/01 00:00:00:000
SCHEDULING RESOLUTION: 1 SECOND
SCHEDULING UNIT: 60 SECONDS

SCHEDULING MAP [0 PLANE]    ← 2901
1,0,0,1,0,0,1,0,0,1
0,0,1,0,0,1,0,0,1,0
0,1,0,0,1,0,0,1,0,0
1,0,0,1,0,0,1,0,0,1
0,0,1,0,0,1,0,0,1,0
0,1,0,0,1,0,0,1,0,0
```

FIG. 30

```
┌ 3000
│
│  REFERENCE POINT IN TIME: 2015/01/01 00:00:00:000
│  SCHEDULING RESOLUTION: 1 SECOND
│  SCHEDULING UNIT: 60 SECONDS
│
│  SCHEDULING MAP [0 PLANE]         ⤶ 3001
│  2,0,0,0,0,0,0,2,0,0
│  0,0,0,0,2,0,0,0,0,0
│  0,2,0,0,0,0,0,0,2,0
│  0,0,0,0,0,2,0,0,0,0
│  0,0,2,0,0,0,0,0,0,2
│  0,0,0,0,0,0,2,0,0,0
```

FIG. 31

```
┌─ 3100
│
│  INFORMATION TABLE FOR UE #1 (eNB #1)  ←─ 3101
│  PERIODICITY VALUE: 3 SECONDS
│  ID: 1 ACTUAL TIMER VALUE: 3 SECONDS:  REPORT UNIT 1
│  ID: 2 ACTUAL TIMER VALUE: 9 SECONDS: REPORT UNIT 3
│
│  INFORMATION TABLE FOR UE #2 (eNB #2)  ←─ 3102
│  PERIODICITY VALUE: 7 SECONDS
│  ID: 1 ACTUAL TIMER VALUE: 7 SECONDS: REPORT UNIT 1
│  ID: 2 ACTUAL TIMER VALUE: 20 SECONDS: REPORT UNIT 2
```

INFORMATION TABLE FOR UE #3
PERIODICITY VALUE: 3 SECONDS
ID #1: ACTUAL TIMER VALUE: 3 SECONDS: REPORT UNIT 1
ID #2: ACTUAL TIMER VALUE: 9 SECONDS: REPORT UNIT 3
ID #3: ACTUAL TIMER VALUE: 7 SECONDS: REPORT UNIT 2
ID #4: ACTUAL TIMER VALUE: 20 SECONDS: REPORT UNIT 6

INFORMATION TABLE FOR UE #1 (eNB #1)  ← 3101
PERIODICITY VALUE: 3 SECONDS
ID: 1 ACTUAL TIMER VALUE: 3 SECONDS: REPORT UNIT 1
ID: 2 ACTUAL TIMER VALUE: 9 SECONDS: REPORT UNIT 3

INFORMATION TABLE FOR UE #2 (eNB #2)  ← 3102
PERIODICITY VALUE: 7 SECONDS
ID: 1 ACTUAL TIMER VALUE: 7 SECONDS: REPORT UNIT 1
ID: 2 ACTUAL TIMER VALUE: 20 SECONDS: REPORT UNIT 2

NFORMATION TABLE FOR UE #3 (eNB #1)  ← 3400
PERIODICITY VALUE: 3 SECONDS
ID: 1 ACTUAL TIMER VALUE: 3 SECONDS: REPORT UNIT 1
ID: 2 ACTUAL TIMER VALUE: 9 SECONDS: REPORT UNIT 3
ID: 3 ACTUAL TIMER VALUE: 7 SECONDS: REPORT UNIT 2
ID: 4 ACTUAL TIMER VALUE: 20 SECONDS: REPORT UNIT 6

FIG. 36

```
┌─ 2900
│
│  REFERENCE POINT IN TIME: 2015/01/01 00:00:00:000
│  SCHEDULING RESOLUTION: 1 SECOND
│  SCHEDULING UNIT: 60 SECONDS
│
│  SCHEDULING MAP [0 PLANE]
│  1,3,0,1,3,0,1,3,0,1         ←── 2901
│  3,0,1,3,0,1,3,0,1,3
│  0,1,3,0,1,3,0,1,3,0
│  1,3,0,1,3,0,1,3,0,1
│  3,0,1,3,0,1,3,0,1,3
│  0,1,3,0,1,3,0,1,3,0
```

REFERENCE POINT IN TIME: 2015/01/01 00:00:00:000
SCHEDULING RESOLUTION: 1 SECOND
SCHEDULING UNIT: 60 SECONDS
STARTING BLOCK: 1
PERIODICITY VALUE: 3 SECONDS
CORRECTION VALUE: NONE
COMMUNICATION WITH SERVER #1 (REPORT UNIT 1)
COMMUNICATION WITH SERVER #2 (REPORT UNIT 3)
COMMUNICATION WITH SERVER #3 (REPORT UNIT 2)
COMMUNICATION WITH SERVER #4 (REPORT UNIT 6)

REFERENCE POINT IN TIME: 2015/01/01 00:00:00:000
SCHEDULING RESOLUTION: 1 SECOND
SCHEDULING UNIT: 60 SECONDS

SCHEDULING MAP [0 PLANE]
1,0,0,1,0,0,1,0,0,1           ↙ 2901
0,0,1,0,0,1,0,0,1,0
0,1,0,0,1,0,0,1,0,0
1,0,0,1,0,0,1,0,0,1
0,0,1,0,0,1,0,0,1,0
0,1,0,0,1,0,0,1,0,0

FIG. 41

```
┌─ 3100
│                                           ┌─ 3101
│ INFORMATION TABLE FOR UE #1 (eNB #1)
│ PERIODICITY VALUE: 3 SECONDS
│ ID #1 ACTUAL TIMER VALUE: 3 SECONDS REPORT UNIT 1
│ ID #2 ACTUAL TIMER VALUE: 9 SECONDS REPORT UNIT 3
│
│                                           ┌─ 3102
│ INFORMATION TABLE FOR UE #2 (eNB #2)
│ PERIODICITY VALUE: 7 SECONDS
│ ID #1 ACTUAL TIMER VALUE: 7 SECONDS REPORT UNIT 1
│ ID #2 ACTUAL TIMER VALUE: 20 SECONDS REPORT UNIT 2
│
│                                           ┌─ 3400
│ INFORMATION TABLE FOR UE #3 (eNB #2)
│ PERIODICITY VALUE: 3 SECONDS
│ ID #1 ACTUAL TIMER VALUE: 3 SECONDS REPORT UNIT 1
│ ID #2 ACTUAL TIMER VALUE: 9 SECONDS REPORT UNIT 3
│ ID #3 ACTUAL TIMER VALUE: 7 SECONDS REPORT UNIT 2
│ ID #4 ACTUAL TIMER VALUE: 20 SECONDS REPORT UNIT 6
```

REFERENCE POINT IN TIME: 2015/01/01 00:00:00:000
SCHEDULING RESOLUTION: 1 SECOND
SCHEDULING UNIT: 60 SECONDS
STARTING BLOCK: 2
PERIODICITY VALUE: 3 SECONDS
CORRECTION VALUE: NONE
COMMUNICATION WITH SERVER #1 (REPORT UNIT 1)
COMMUNICATION WITH SERVER #2 (REPORT UNIT 3)
COMMUNICATION WITH SERVER #3 (REPORT UNIT 2)
COMMUNICATION WITH SERVER #4 (REPORT UNIT 6)

FIG. 45

```
┌─ 4500
│
│  REFERENCE POINT IN TIME: 2015/01/01 00:00:00:000
│  SCHEDULING RESOLUTION: 1 SECOND
│  SCHEDULING UNIT: 60 SECONDS
│
│  SCHEDULING MAP [0 PLANE]
│  3,0,0,3,0,0,3,0,0,3              ←─ 4501
│  0,0,3,0,0,3,0,0,3,0
│  0,3,0,0,3,0,0,3,0,0
│  3,0,0,3,0,0,3,0,0,3
│  0,0,3,0,0,3,0,0,3,0
│  0,3,0,0,3,0,0,3,0,0
```

REFERENCE POINT IN TIME: 2015/01/01 00:00:00:000
SCHEDULING RESOLUTION: 1 SECOND
SCHEDULING UNIT: 60 SECONDS
STARTING BLOCK: 0
PERIODICITY VALUE: 3 SECONDS
CORRECTION VALUE: NONE
COMMUNICATION WITH SERVER #1 (REPORT UNIT 1)
COMMUNICATION WITH SERVER #2 (REPORT UNIT 3)
COMMUNICATION WITH SERVER #3 (REPORT UNIT 2)
COMMUNICATION WITH SERVER #4 (REPORT UNIT 6)

WIRELESS COMMUNICATION SYSTEM, CONTROL APPARATUS, AND WIRELESS TERMINAL

CROSS-REFERENCE TO RELATED APPLICATION

This application is based upon and claims the benefit of priority of the prior Japanese Patent Application No. 2015-112628, filed on Jun. 2, 2015, the entire contents of which are incorporated herein by reference.

FIELD

The embodiment discussed herein is related to a wireless communication system, a control apparatus, and wireless terminal.

BACKGROUND

In the related art, for example, in order to maintain a session that is established between a terminal and a server, a session maintenance operation of transmitting and receiving a session maintenance signal between the terminal and the server is known. In some cases, the session maintenance operation is performed in each of multiple protocols within the terminals.

Furthermore, a technology is known in which a session maintenance signal is not transmitted on a radio channel in such a manner that a reduction in power consumption and a radio resource on the terminal side are optimized (for instance, refer to Japanese Laid-open Patent Publication No. 2013-211747 that will be described below). Furthermore, a technology is known in which communication with an external device is performed using a session that is already established in such a manner that a network resource is efficiently used (for example, refer to Japanese Laid-open Patent Publication No. 2013-118663 that will be described below). Furthermore, a technology is known in which a timer is used for a connection using a radio resource (for example, refer to Japanese Laid-open Patent Publication No. 2013-046274 that will be described below).

SUMMARY

According to an aspect of the invention, a wireless communication system includes a wireless terminal configured to: establish each of at least one session between the wireless terminal and each of at least one server via a wireless communication with a wireless base station, and transmit each of at least one specified signal for maintaining the established at least one session using a periodic radio resource allocated to the wireless terminal, and a control apparatus including a processor configured to: obtain each of at least one time-out time set for each of the at least one session, determine a resource periodicity of the periodic radio resource based on the shortest time-out time among the at least one time-out time, and determine each of at least one signal periodicity for transmitting each of the at least one specified signal based on the determined resource periodicity.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating one example of an information table that is stored in the session timer management unit according to the embodiment;

FIG. 7 is a diagram illustrating one example of the information table that results from changing by the session timer management unit according to the embodiment;

FIG. 8 is a diagram illustrating one example of a timing of wireless activation before redefinition of a session timer according to the embodiment;

FIG. 9 is a diagram illustrating one example of the timing of the wireless activation after the redefinition of the session timer according to the embodiment;

FIG. 12 is a diagram illustrating one example of scheduling by the scheduling control unit according to the embodiment;

FIG. 13 is a diagram illustrating one example of a result of the scheduling that the scheduling control unit according to the embodiment notifies a session timer notification unit of;

FIG. 14 is a diagram (the first one) illustrating one example of the scheduling in a case where information on UE is added by the scheduling control unit according to the embodiment;

FIG. 15 is a diagram (the second one) illustrating one example of the scheduling in the case where the information on the UE is added by the scheduling control unit according to the embodiment;

FIG. 16 is a diagram (the first one) illustrating one example of correction of the scheduling by the scheduling control unit according to the embodiment;

FIG. 17 is a diagram (the second one) illustrating one example of the correction of the scheduling by the scheduling control unit according to the embodiment;

FIG. 19 is a diagram illustrating one example of the scheduling map that corresponds to a prime number which is applicable to the embodiment;

FIG. 20 is a diagram illustrating one example of a periodicity value of the UE that the session timer management unit according to the embodiment notifies the scheduling control unit of;

FIG. 21 is a diagram (the first one) illustrating one example of mapping to the scheduling map that corresponds to the prime number that is applicable to the embodiment;

FIG. 22 is a diagram (the second one) illustrating one example of the mapping to the scheduling map that corresponds to the prime number that is applicable to the embodiment;

FIG. 23 is a diagram (the third one) illustrating one example of the mapping to the scheduling map that corresponds to the prime number that is applicable to the embodiment;

FIG. 24 is a diagram (the fourth one) illustrating one example of the mapping to the scheduling map that corresponds to the prime number that is applicable to the embodiment;

FIG. 27 is a diagram illustrating one example of setting information in UE #1 according to the embodiment;

FIG. 28 is a diagram illustrating one example of setting information in UE #2 according to the embodiment;

FIG. 29 is a diagram illustrating one example of setting information in eNB #1 according to the embodiment;

FIG. 30 is a diagram illustrating one example of setting information in eNB #2 according to the embodiment;

FIG. 31 is a diagram illustrating one example of setting information in MME #1 according to the embodiment;

FIG. 34 is a diagram illustrating one example of an information table for UE #3 according to the embodiment;

FIG. 35 is a diagram illustrating one example of post-change setting information (the first one) in MME #1 according to the embodiment;

FIG. 36 is a diagram illustrating one example of post-change setting information (the first one) in eNB #1 according to the embodiment;

FIG. 37 is a diagram illustrating one example of setting information in UE #3 according to the embodiment;

FIG. 40 is a diagram illustrating one example of the post-change setting information (the second one) in eNB #1 according to the embodiment;

FIG. 41 is a diagram illustrating one example of the post-change setting information (the second one) in MME #1 according to the embodiment;

FIG. 43 is a diagram illustrating one example of post-change setting information (the first one) in UE #3 according to the embodiment;

FIG. 45 is a diagram illustrating one example of setting information in eNB #3 according to the embodiment; and FIG. 46 is a diagram illustrating one example of the post-change setting information (the second one) in UE #3 according to the embodiment.

DESCRIPTION OF EMBODIMENT

Figure 1:
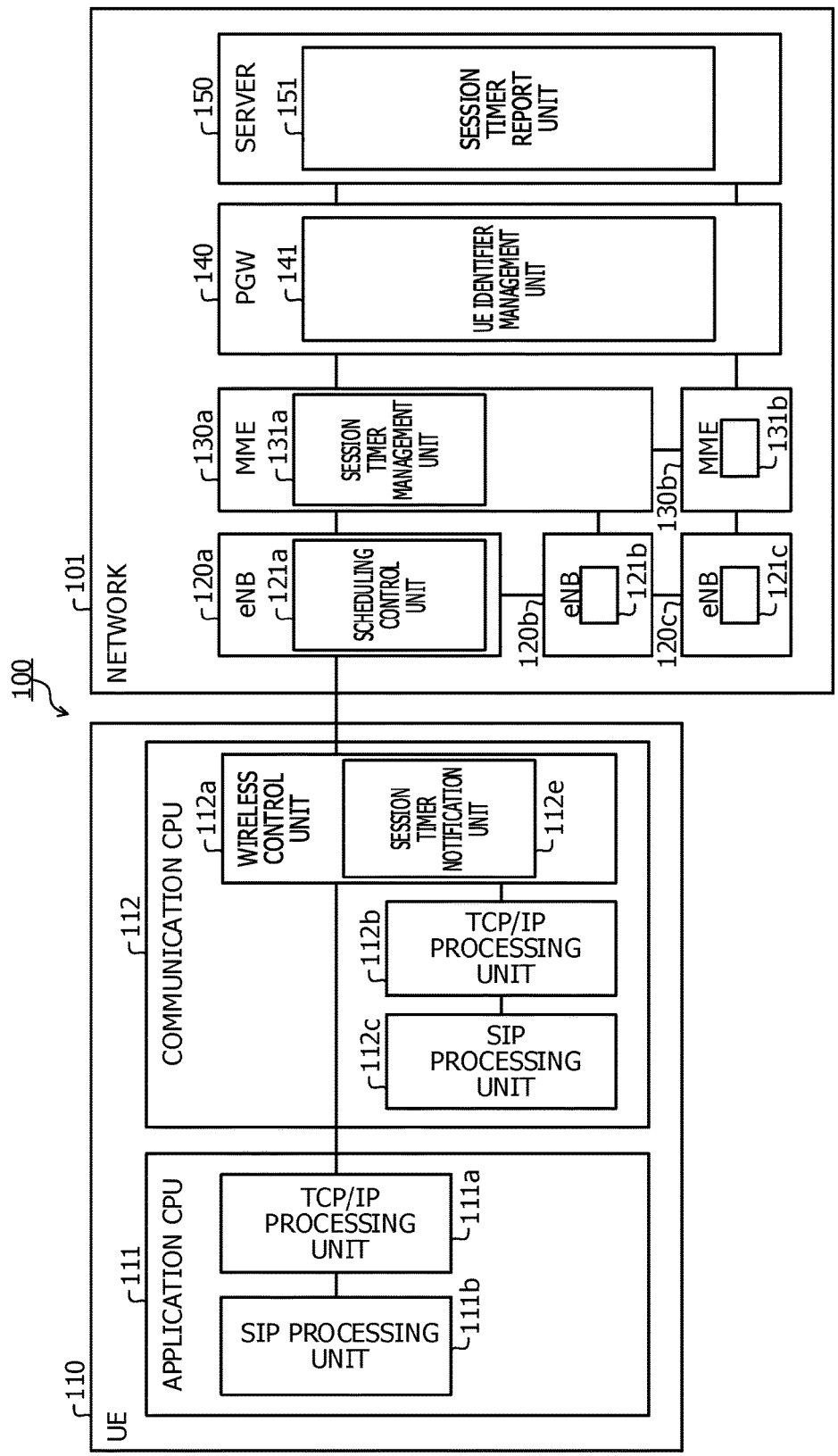
FIG. 1 is one example of a wireless communication system according to an embodiment.

However, in the technology in the related art, which is described above, for example, when processing of each protocol performs a session maintenance operation in a terminal, with a timing of a session maintenance operation in the processing of each protocol, the frequency with which a radio channel is established is increased. For this reason, there is a problem that session maintenance is difficult to perform using a radio resource efficiently, and power consumption by mobile equipment is increased.

An object of the embodiment according to one aspect of the present disclosure is to provide a wireless communication system, a transmission periodicity adjustment device, and mobile equipment, which can improve utilization efficiency of a radio resource in session maintenance and achieve power saving for the mobile equipment.

The wireless communication system, the transmission periodicity adjustment device, and the mobile equipment according to an embodiment of the present disclosure will be described below referring to the drawings.

Embodiment

Wireless Communication System According to the Embodiment

FIG. 1 is one example of the wireless communication system according to the embodiment. As illustrated in FIG. 1, a wireless communication system 100 includes UE 110 and a network 101. For example, various mobile communication systems, such as Long Term Evolution (LTE) or Long Term Evolution-Advanced (LTE-A) can be applied to the wireless communication system 100.

The UE 110 is the mobile equipment (a mobile station) that performs communication between the UE 110 and the network 101. As one example, user equipment (a user terminal) in 3rd Generation Partnership Project (3GPP) can be applied as the UE 110. The UE 110 establishes a session with a server 150 through wireless communication with eNBs 120a to 120d that will be described below. Then, the UE 110 transmits a session maintenance signal for maintaining the established session using a radio resource that is allocated to the session maintenance signal of the UE 110 from the network 101. In an example in FIG. 1, one item of UE 110 is illustrated, but multiple items of UE 110 may be included in the wireless communication system 100.

For example, the UE 110 includes an application CPU 111 and a communication CPU 112. The application CPU 111 is a processor that mainly performs a user operation or application software processing. In the application CPU 111, for example, a TCP/IP processing unit 111a and an SIP processing unit 111b are realized.

The TCP/IP processing unit 111a performs transmission control protocol (TCP) processing and Internet protocol (IP)

processing in the application CPU 111. The SIP processing unit 111b performs session establishment protocol (session initiation protocol (SIP)) processing in communication processing by the application CPU 111.

Furthermore, in the application CPU 111, for example, hypertext transfer protocol (HTTP) processing, simple mail transfer protocol (SMTP) processing, post office protocol version 3 (POP3) processing, and the like, as well as the TCP/IP processing unit 111a and the SIP processing unit 111b, may be realized.

The communication CPU 112 is a processor that mainly performs processing for wireless communication with a network. In the communication CPU 112, for example, a wireless control unit 112a, a TCP/IP processing unit 112b, and an SIP processing unit 112c are realized.

The wireless control unit 112a performs control of the wireless communication by the UE 110. The TCP/IP processing unit 112b performs the TCP processing and the IP processing in the communication processing by the communication CPU 112. The SIP processing unit 112c performs the SIP processing in the communications processing by the communication CPU 112. Furthermore, in the communication CPU 112, various other types of processing, as well as the wireless control unit 112a, the TCP/IP processing unit 112b, and the SIP processing unit 112c, may be realized. Furthermore, the wireless control unit 112a includes a session timer notification unit 112e. The session timer notification unit 112e will be described below.

The network 101 includes the eNBs 120a to 120c, MMEs 130a and 130b, a PGW 140, and the server 150.

The eNBs 120a to 120c are evolved Nodes B (eNBs) that are wireless base station devices which perform wireless communication between the eNBs 120a and 120c, respectively, and the UE. In the example that is illustrated in FIG. 1, the UE 110 makes a wireless connection to the eNB 120a, and a scheduling control unit 121a performs the wireless communication between the eNBs 120a to 120c and the UE 110. Furthermore, the eNBs 120a to 120c are connected to one another by interfaces among base stations, such as X2 interfaced. Furthermore, the eNBs 120a to 120c include the scheduling control units 121a to 121c, respectively. The scheduling control units 121a to 121c will be described below.

The Mobility Management Entity (MME) 130a accommodates the eNBs 120a and 120b, and performs control plane (C-plane) processing in communication through the eNBs 120a and 120b. The MME 130b accommodates the eNB 120c, and performs processing for a C-plane in the communication through the eNB 120c.

The C-plane is a functional group for controlling a telephone call or a network between each device. As one example, the C-plane is used for a connection for a packet call, a configuration of a path for transferring user data, handover control, and the like. Furthermore, the MMEs 130a and 130b are connected to each other with an inter-MME interface. Furthermore, the MMEs 130a and 130b include session timer management units 131a and 131b, respectively. The session timer management units 131a and 131b will be described below.

The PGW 140 is a packet data network gateway for making a connection to an external network (for example, the server 150). The PGW 140, for example, relays the user data between the MMEs 130a and 130b and the server 150. Furthermore, the PGW 140 performs IP address allocation in which an IP address is allocated to the UE 110, in order for the UE 110 to transmit and receive an IP flow. In the example in FIG. 1, one PGW 140 is illustrated, but multiple PGWs 140 may be included in the network 101. Furthermore, the PGW 140 includes a UE identifier management unit 141. The UE identifier management unit 141 will be described below.

Furthermore, a serving gateway (SGW) may be provided between the PGW 140 and the MMEs 130a and 130b. The SGW is a serving gateway that performs processing for a U-plane (user plane) in the communication throughout the eNBs 120a to 120c. For instance, the SGW performs the processing for the U-plane processing in the communication by the UE 110. The U-plane is a functional group for transferring the user data.

The server 150 is a server device that handles various protocols. For example, the UE 110 establishes a session between the UE 110 and the server 150 through the eNB 120a and the PGW 140, and thus performs the communication between the UE 110 and the server 150, thereby using a service that is provided by the server 150. In the example in FIG. 1, one server 150 is illustrated, but multiple servers 150 may be included in the network 101.

Furthermore, the server 150 includes a session timer report unit 151. When the server itself to which the session timer report unit 151 belongs establishes a session between the server itself to which the session timer report unit 151 belongs and the UE (for example UE 110), the session timer report unit 151 notifies the UE identifier management unit 141 of the PGW 140 of information on a type (a session timer) of the established session along with the IP address of the UE. For example, a session timer interval (an actual timer value that will be described below) for configuring a periodicity of a session maintenance protocol operation that is performed between the UE 110 and the server 150, an identifier of the server (or the session), an IP address of the UE 110, and the like are included information on the session timer.

Furthermore, in a case where the session that is established between the server 150 itself and the UE 110 is discarded, or in a case where the session timer of the session that is established between the server 150 itself and the UE 110 is changed, the session timer report unit 151 may also transmit the information on the session timer to the UE identifier management unit 141.

Furthermore, in a case where multiple PGWs 140 are present, the session timer report unit 151 notifies the UE identifier management unit 141 of the PGW 140, which accommodates the UE 110 that establishes the session, among the multiple PGWs 140, of the information on the session timer. Furthermore, in a case where the session is established between the PGW 140 itself and each of the multiple items of UE 110, the UE identifier management unit 141 may put together pieces of information on the session times and may notify the UE identifier management unit 141 of the pieces of information on the session times.

The UE identifier management unit 141 of the PGW 140 compares an IP address that is included in the information on the session timer that is notified from the session timer report unit 151 of the server 150 and an IP address that is assigned to the UE. Accordingly, which MME of the MMEs 130a and 130b the UE that is involved in the session timer belongs to can be specified. Then, the UE identifier management unit 141 outputs the information on the session timer that is output from the session timer report unit 151, to the session timer management unit of the specified MME, of the session timer management units 131a and 131b. Furthermore, the UE identifier management unit 141 stores the IP address of the UE 110 and the specified MME, in a state of being associated with each other.

At this point, the session timer management unit 131a of the MME 130a is described, but the same is also true for the session timer management unit 131b of the MME 130b. When establishing a connection (a packet call) between the UE 110 and the PGW 140, the session timer management unit 131a gives pieces of information on the UE 110 and the MME 130a to the UE identifier management unit 141, and makes a request for the assignment of the IP address to the UE 110.

Furthermore, the session timer management unit 131a aggregates pieces of information on the session timer that is notified from the UE identifier management unit 141, into an information table and calculates a periodicity value and a report unit for every item of UE. Calculation of the periodicity value and the report unit will be described below. Furthermore, the session timer management unit 131a notifies the corresponding scheduling control unit of the scheduling control units 121a to 121c of the eNBs of the calculated periodicity value and report unit for every item of UE.

At this point, the scheduling control unit 121a of the eNB 120a is described, but the same is also true for the scheduling control units 121b and 121c of the eNBs 120b and 120c, respectively. Based on information that is notified from the session timer management unit 131a, the scheduling control unit 121a performs scheduling of the session timer on the UE 110 that resides in a cell that is covered by the eNB 120a. Then, the scheduling control unit 121a notifies the session timer notification unit 112e of the UE 110 of a result of the scheduling. The notification is performed with a wireless signal from the eNB 120a to the UE 110.

The session timer notification unit 112e of the UE 110 notifies each protocol processing unit (client software or an operating system) in the UE 110 of the result of the scheduling that is notified from the scheduling control unit 121a. For example, the TCP/IP processing unit 111a, the SIP processing unit 111b, the TCP/IP processing unit 112b, and the SIP processing unit 112c are included in each protocol processing unit in the UE 110.

In a case where the session between the UE 110 and the server 150 is established, each protocol processing unit in the UE 110 performs processing of the session maintenance protocol between the UE 110 and the server 150 based on the result of the scheduling that is notified from the session timer notification unit 112e. The processing of the session maintenance protocol is processing that maintains the session between the UE 110 and the server 150, for example, by transmitting the session maintenance signal from the UE 110 to the server 150 with a periodicity that is equal to or less than a prescribed timer value.

Hardware of the UE According to the Embodiment

Figure 2:
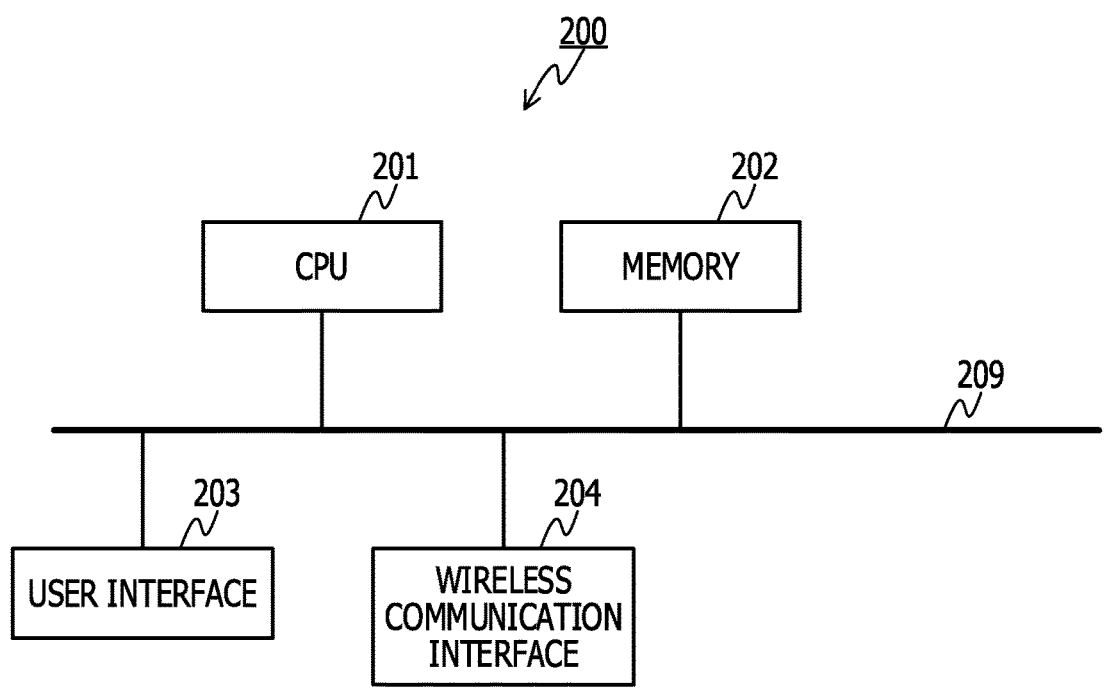
FIG. 2 is a diagram illustrating one example of a hardware configuration of UE according to the embodiment.

FIG. 2 is a diagram illustrating one example of the hardware of the UE according to the embodiment. The UE 110 that is illustrated FIG. 1 can be realized, for example, as a communication device 200 that is illustrated in FIG. 2. The communication device 200 includes a CPU 201, a memory 202, a user interface 203, and a wireless communication interface 204. The CPU 201, the memory 202, the user interface 203, and the wireless communication interface 204 are connected to a bus 209.

The central processing unit (CPU) 201 manages control of the entire communication device 200. The memories 202 include a main memory and an auxiliary memory. The main memory is, for example, a random access memory (RAM). The main memory is used as a work area for the CPU 201. The auxiliary memory is, for example, a nonvolatile memory, such as a magnetic disk, an optical disk, or a flash memory. Various programs that cause the communication device 200 to operate are stored in the auxiliary memory. The program that is stored in the auxiliary memory is loaded onto the main memory and is executed by the CPU 201.

The user interfaces 203 include, for example, an input device that receives an operational input from a user, and an output device that outputs information to the user. The input device can be realized, for example, as a key (for example, a keyboard), a remote controller, or the like. The output device can be realized, for example, as a display, a speaker, or the like. Furthermore, the input device and the output device may be realized as a touch panel. The user interface 203 is controlled by the CPU 201.

The wireless communication interface 204 is a communication interface that performs the communication between the communication device 200 itself and the outside (for example, the eNBs 120a to 120c) of the communication device 200 in a wireless manner. The wireless communication interface 204 is controlled by the CPU 201.

The application CPU 111 and the communication CPU 112 that are illustrated in FIG. 1 can be realized, for example, as the CPU 201. Furthermore, the communication CPU 112 performs the control of the wireless communication by the wireless communication interface 204.

Furthermore, a transmission unit that transmits the session maintenance signal using the radio resource that is allocated to the session maintenance signal can be realized as the CPU 201 and the wireless communication interface 204. Furthermore, a reception unit that receives information indicating a transmission periodicity of the session maintenance signal for every session that is established by the UE 110, through the eNB 120a, can be realized as the CPU 201 and the wireless communication interface 204.

eNB According to the Embodiment

Figure 3:
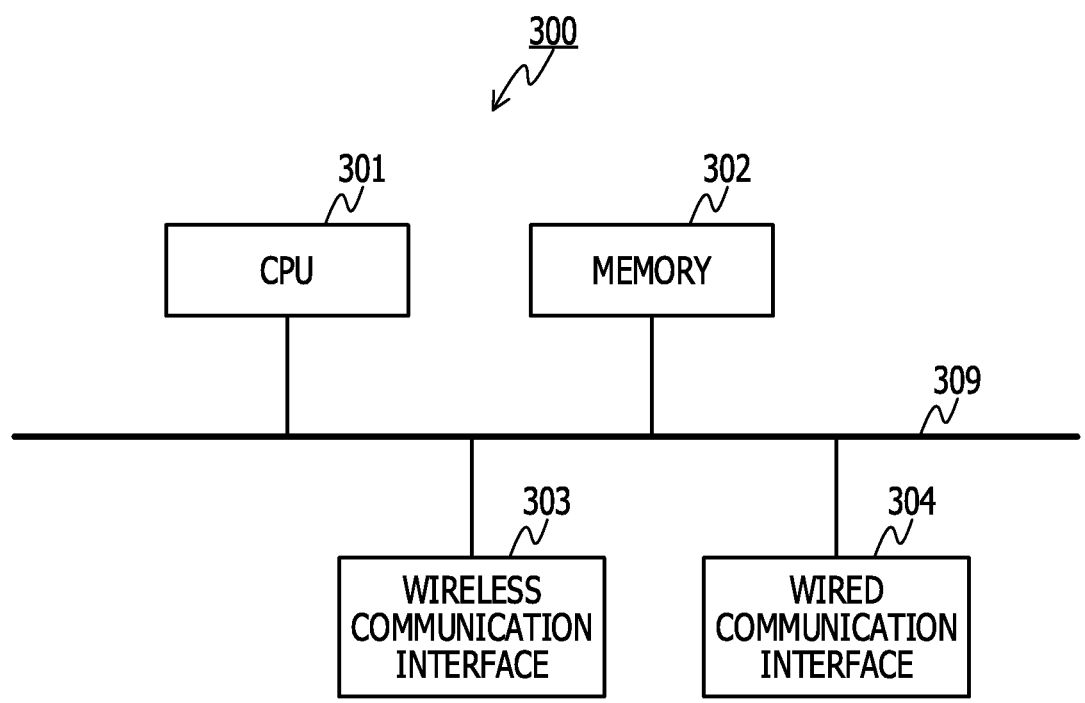
FIG. 3 is a diagram illustrating one example of an eNB according to the embodiment.

FIG. 3 is a diagram illustrating one example of the eNB according to the embodiment. Each of the eNBs 120a to 120c that are illustrated in FIG. 1 can be realized, for example, as a communication device 300 that is illustrated in FIG. 3. The communication device 300 includes a CPU 301, a memory 302, a wireless communication interface 303, and a wired communication interface 304. The CPU 301, the memory 302, the wireless communication interface 303, and the wired communication interface 304 are connected to one another with a bus 309.

The CPU 301 manages control of the entire communication device 300. The memories 302 include a main memory and an auxiliary memory. The main memory is, for example, a RAM. The main memory is used as a work area for the CPU 301. The auxiliary memory is, for example, a nonvolatile memory, such as a magnetic disk, an optical disk, or a flash memory. Various programs that cause the communication device 300 to operate are stored in the auxiliary memory. The program that is stored in the auxiliary memory is loaded onto the main memory and is executed by the CPU 301.

The wireless communication interface 303 is a communication interface that performs the communication between the communication device 300 itself and the outside (for example, the UE 110) of the communication device 300 in a wireless manner. The wireless communication interface 303 is controlled by the CPU 301.

The wired communication interface 304 is a communication interface that performs the communication between the communication device 300 itself and the outside (for example, the MMEs 130a and 130b, the PGW 140, and the SGW) of the communication device 300 in a wired manner. The wired communication interface 304 is managed by the CPU 301.

The scheduling control units 121a to 121c that are illustrated in FIG. 1 can be realized, for example, as the CPU 301.

Figure 4:
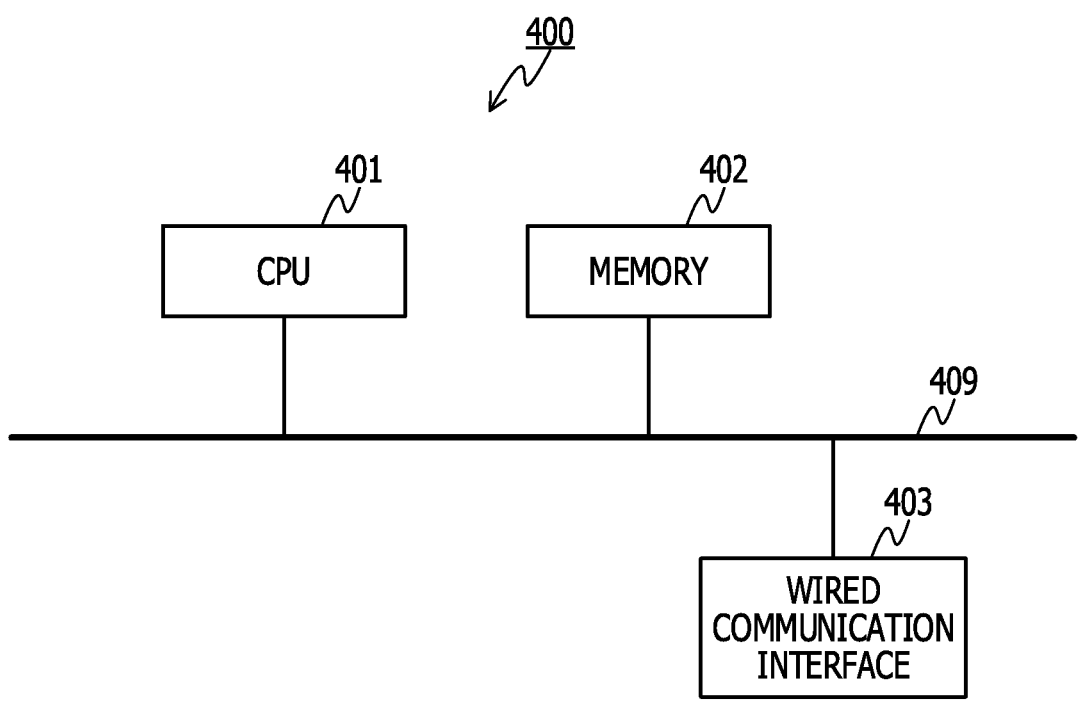
FIG. 4 is a diagram illustrating one example of hardware configurations of an MME, a PGW, and a server according to the embodiment.

Hardware Configurations of the MME, the PGW, and the Server According to the Embodiment FIG. 4 is a diagram illustrating one example of hardware configurations of the MME, the PGW, and the server according to the embodiment. Each of the MMEs 130a and 130b that are illustrated in FIG. 1 can be realized, for example, as a communication device 400 that is illustrated in FIG. 4. The communication device 400 includes a CPU 401, a memory 402, and a wired communication interface 403. The CPU 401, the memory 402, and the wired communication interface 403 are connected to one another with a bus 409.

The CPU 401 manages control of the entire communication device 400. The memories 402 include a main memory and an auxiliary memory. The main memory is, for example, a RAM. The main memory is used as a work area for the CPU 401. The auxiliary memory is, for example, a nonvolatile memory, such as a magnetic disk, an optical disk, or a flash memory. Various programs that cause the communication device 400 to operate are stored in the auxiliary memory. The program that is stored in the auxiliary memory is loaded onto the main memory and is executed by the CPU 401.

The wired communication interface 403 is a communication interface that performs the communication between the communication device 400 itself and the communication device 400 in a wired manner. The wired communication interface 403 performs the communication between the communication device 400 itself and external communication devices, for example, such as the eNBs 120a to 120c and the PGW 140. The wired communication interface 403 is managed by the CPU 401.

The session timer management units 131a and 131b that are illustrated in FIG. 1, for example, can be realized as the CPU 301, the memory 402, and the wired communication interface 403.

Furthermore, the PGW 140 that is illustrated in FIG. 1 can be realized, for example, as the communication device 400. In this case, the wired communication interface 403 performs the communication between the communication device 400 itself and the external communication devices, such as the eNBs 120a to 120c, the MMEs 130a and 130b, and the server 150. Furthermore, the UE identifier management unit 141 that is illustrated in FIG. 1 can be realized, for example, as the CPU 301. In this case, a determination unit that determines a periodicity of the allocation (a periodicity value) to the UE 110 can be realized, for example, as the CPU 401. Furthermore, based on the allocation periodicity that is determined by the determination unit, an adjustment unit that adjusts the transmission periodicity of the session maintenance signal by the UE 110 can be realized, for example, as the CPU 401 and the wired communication interface 403.

Furthermore, the server 150 that is illustrated in FIG. 1 can be realized, for example, as the communication device 400. In this case, the wired communication interface 403 performs, for example, the communication between the communication device 400 itself and the external communication devices, such as the PGW 140. Furthermore, the session timer report unit 151 that is illustrated in FIG. 1 can be realized as the CPU 301.

Processing by the Session Timer Management Unit According to the Embodiment

Figure 5:
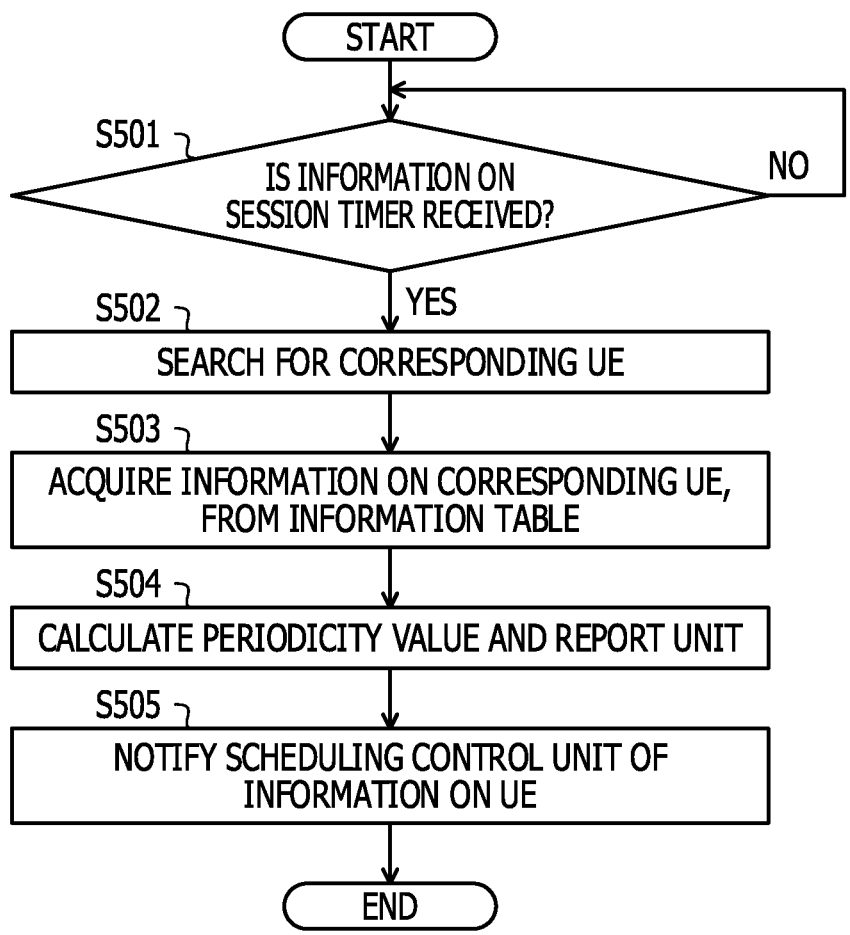
FIG. 5 is a flowchart illustrating one example of processing by a session timer management unit according to the embodiment.

FIG. 5 is a flowchart illustrating one example of processing by the session timer management unit according to the embodiment. The processing by the session timer management unit 131a of the MME 130a is described above, but the same is also true for processing by the session timer management unit 131b of the MME 130b.

First, the session timer management unit 131a determines whether or not the information on the session timer is received from the UE identifier management unit 141 (Step S501), and waits until the information on the session timer is received (a No loop in Step S501). When receiving the information on the session timer (Yes in Step S501), the session timer management unit 131a proceeds to Step S502. That is, the session timer management unit 131a searches an information table, which is managed by the session timer management unit 131a, for the corresponding UE, based on the IP address that is included in the information on the session timer which is received (Step S502).

Next, the session timer management unit 131a acquires information on the corresponding UE that is found as a result of the search in Step S502, from the information table that is managed by the session timer management unit 131a (Step S503).

Next, based on the information table that is managed by the session timer management unit 131a, the session timer management unit 131a performs calculation of the periodicity value and the report unit for the corresponding UE (Step S504). Furthermore, based on the result of the calculation in Step S504, the session timer management unit 131a updates the information table that is managed by the session timer management unit 131a.

Next, the session timer management unit 131a notifies the scheduling control unit of the eNB that corresponds to the UE, among the scheduling control units 121a to 121c, of the information on the corresponding UE (Step S505), and ends a processing sequence. The periodicity value and the report unit that are calculated for the corresponding UE in Step S504 are included in the information on the UE that is notified in Step S505.

Information Table that is Stored in the Session Timer Management Unit According to the Embodiment FIG. 6 is a diagram illustrating one example of the information table that is stored in the session timer management unit according to the embodiment. An information table 600 that is illustrated in FIG. 6 is an information table that is stored, for example, in the session timer management unit 131a. The information table 600 that is stored in the session timer management unit 131a is described, but the same is also true for the information that is stored in the session timer management unit 131b.

Based on the information on the session timer, the IP address, and the like that are notified from the session timer report unit 151 through the UE identifier management unit 141, the session timer management unit 131a specifies the UE and retains the information table 600 for the specified UE. The information table 600, for example, can be retained by being stored in the memory 402 that is illustrated in FIG. 4.

The information table 600 indicates the periodicity value and a timer for each of UE #1 to UE #n (for every IP address of the UE). Each of UE #1 to UE #n, for example, corresponds to the UE 110 that is illustrated in FIG. 1. Furthermore, in the information table 600, a timer is set for every session (every session identifier) that is established by the corresponding UE. For example, in an example in FIG. 6, two sessions are established in UE #1, the information table 600 includes timer #1 and timer #2 as timers of UE #1. Moreover, session identifiers of timers #1 and timer #2 are the same value, but because sessions with different servers are established, the session identifiers of timer #1 and timer #2 indicate different sessions, respectively.

The periodicity value is a minimum-unit periodicity, among periodicities of the session maintenance operation in the corresponding UE. The periodicity value, for example, can be calculated and thus acquired by the session timer management unit 131*a* based on the information on the session timer.

The timer includes a server identifier, the session identifier, the actual timer value, and the report unit. The server identifier is an identifier that is available for specifying a server (for example, the server 150) with which the corresponding session is established. The server identifier, for example, can be made to be the IP address of the server. The server identifier, for example, can be acquired from the information on the session timer that is notified from the session timer report unit 151 through the UE identifier management unit 141.

The session identifier is an identifier that is available for specifying the corresponding sessions. The session identifier is an identifier that is given by the server with which the corresponding session is established. For example, in the case of a TCP, the session identifier can be made to be a session ID or the like that is recorded with an ID of TCP port. In the case of an SIP, the session identifier can be made to be a session ID or the like that is written with the ID of the TCP port or a session description protocol (SDP). Accordingly, the session identifier can be made to be information that is possible to determine on the UE side. The session identifier, for example, can be acquired from the information on the session timer that is notified from the session timer report unit 151 through the UE identifier management unit 141.

The actual timer value indicates a time-out time that is set by the server for the corresponding session. For example, the server 150 times the length of the time for which the session maintenance operation by the UE 110 is not performed. When the timed length of the time exceeds the actual timer value, the server 150 discards the session. The session maintenance operation performs transmission of the session maintenance signal to the server 150.

The UE 110 transmits the session maintenance signal to the server with a shorter periodicity than the length of the time that is indicated by the actual timer value which is assigned from the session timer report unit 151, and thus can maintain the session between the UE 110 itself and the server 150. The actual timer value, for example, can be acquired from the information on the session timer that is notified from the session timer report unit 151 through the UE identifier management unit 141.

The report unit is a parameter for determining a periodicity with which the UE 110 performs the session maintenance operation by combining the report unit and the periodicity value. For example, in a case where the report unit is 2, the UE 110 performs the session maintenance operation with a periodicity that is equivalent to two times a periodicity that is indicated by the periodicity value. The report unit, for example, can be calculated and thus acquired by the session timer management unit 131*a* based on the information on the session timer.

When a change to the information table 600 occurs, the session timer management unit 131*a* notifies the scheduling control unit that corresponds to the UE in which the change occurs, among the scheduling control units 121*a* to 121*c*, of the change to the information table 600.

Furthermore, when new addition or deletion of the information on the session timer is notified from the session timer report unit 151 through the UE identifier management unit 141, the session timer management unit 131*a* specifies the corresponding UE from the information table 600, and updates each timer of the corresponding UE. For example, the session timer management unit 131*a* sets the smallest actual timer value among the actual timer values of each timer of the corresponding UE, as the periodicity value of the corresponding UE.

Then, the session timer management unit 131*a* sets the report unit for every timer of the corresponding UE. That is, for each of the timers of the corresponding UE, the session timer management unit 131*a* calculates the greatest n that does not allow multiples (the periodicity×n) of the periodicity value of the corresponding UE to exceed the actual timer value of the corresponding timer, and sets the calculated n as the report unit of the corresponding timer. The periodicity×n that is based on the n that is set is the periodicity of the session maintenance operation for the corresponding session. As a result, the periodicity of the session maintenance operation is a periodicity that is equal to or less than the actual timer value, and the maintaining of the session is possible.

In the example in FIG. 6, because the smallest value among the actual timer values (15 second and 33 seconds) of timers #1 and #2 of UE #1 is 15 seconds, the periodicity value of UE #1 is set to 15 seconds. Then, because the greatest n that does not allow the periodicity (15 seconds)×n of UE #1 to exceed the actual timer value (15 seconds) of timer #1 is 1, the report unit of timer #1 is set to 1. Furthermore, because the greatest n that does not allow the periodicity (15 seconds)×n of UE #1 to exceed the actual timer value (33 seconds) of timer #2 is 2, the report unit of timer #2 is set to 2.

In this case, UE #1 performs the session maintenance operation at intervals of 14 seconds for timer #1, and performs the session maintenance operation at intervals of 28 seconds for timer #2. As illustrated in FIG. 6, the session timer management unit 131*a* redefines the actual timer value that is notified from the session timer report unit 151, as the periodicity value and the report unit, and performs the session maintenance operation in the UE. Thus, the efficient utilization of the radio resource is possible.

In this manner, the scheduling control unit 121*a* manages the information on the session timer that is notified from the UE identifier management unit 141, for every UE, and calculates the periodicity value and the report unit in such a manner that the timers (the periodicity value×n) of all the sessions are multiples of the periodicity value. Then, the scheduling control unit 121*a* notifies a target scheduling control unit, among the scheduling control units 121*a* to 121*c*, of the periodicity value and the report unit that are calculated.

Information Table that Results from Changing by the Session Timer Management Unit According to the Embodiment FIG. 7 is a diagram illustrating one example of the information table that results from changing by the session timer management unit according to the embodiment. For example, the session timer report unit 151 is made to notify the session timer management unit 131a of the information on the session timer that includes the server identifiers different from those of timers #1 and #2 that are illustrated in FIG. 6, through the UE identifier management unit 141. Furthermore, the UE that is indicated by the IP address which is included in the information on the session timer is made to be UE #1, and the actual timer value that is included in the information on the session timer is made to be 7 seconds.

In this case, the session timer management unit 131a, as illustrated in FIG. 7, adds new timer #3 as the timer of UE #1 in the information table 600. Then, the session timer management unit 131a recalculates the periodicity value of UE #1 and the report unit of every timer of UE #1. Furthermore, the session timer management unit 131a notifies the corresponding scheduling control unit, among the scheduling control units 121a to 121c, of contents that are changed in the information table 600.

In an example in FIG. 7, because the smallest value among the actual timer values (15 second, 33 seconds, and 7 seconds) of timers #1, #2, #3 of UE #1 is 7 seconds, the periodicity value of UE #1 is set to 7 seconds. Then, because the greatest n that does not allow the periodicity (7 seconds)×n of UE #1 to exceed the actual timer value (15 seconds) of timer #1 is 2, the report unit of timer #1 is set to 2. Furthermore, because the greatest n that does not allow the periodicity (7 seconds)×n of UE #1 to exceed the actual timer value (33 seconds) of timer #2 is 4, the report unit of timer #2 is set to 4. Furthermore, because the greatest n that does not allow the periodicity (7 seconds)×n of UE #1 to exceed the actual timer value (7 seconds) of timer #3 is 1, the report unit of timer #3 is set to 1.

In this case, UE #1 performs the session maintenance operation at intervals of 14 seconds for timer #1, at intervals of 28 seconds for timer #2, and at intervals of 7 seconds for timer #3. In this manner, the session timer is redefined and the session maintenance operation by the UE is performed. Thus, the efficient utilization of the radio resource is possible.

Figure 8:
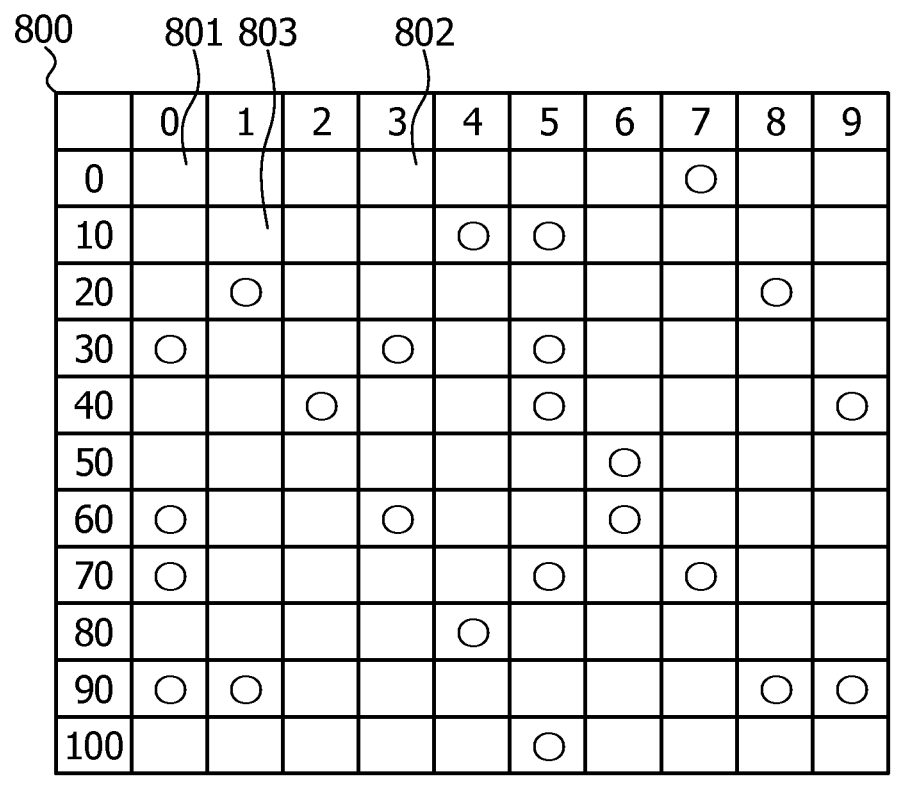

Timing of Wireless Activation Before the Redefinition of the Session Timer According to the Embodiment FIG. 8 is a diagram illustrating one example of a timing of wireless activation before the redefinition of the session timer according to the embodiment. The wireless activation timing 800 that is illustrated in FIG. 8 indicates the timing at which the UE 110 performs the wireless activation by the session maintenance operation, as a reference, before the redefinition of the session timer.

Each block in the wireless activation timing 800 indicates a timing (a time resource). A timing to which "O" is attached in the wireless activation timing 800 indicates a timing at which the UE 110 performs the wireless activation by the session maintenance operation. A reference timing 801 in the wireless activation timing 800 is an initial block in the wireless activation timing 800. A horizontal direction of the wireless activation timing 800 indicates a one second unit, and a vertical direction of the wireless activation timing 800 indicates a ten second unit.

For example, a timing 802 at which the horizontal direction of the wireless activation timing 800 is 3 and the vertical direction thereof is 0 indicates the third timing from the reference timing 801. Furthermore, a timing 803 at which the horizontal direction of the wireless activation timing 800 is 1 and the vertical direction thereof is 10 indicates the eleventh timing from the reference timing 801.

In an example that is illustrated in FIG. 8, the wireless activation by the session maintenance operation is performed at the seventh second, the fourteenth second, the fifteenth second, the twenty-first second, and so forth from the reference timing 801 in the wireless activation timing 800. In this manner, in the example that is illustrated in FIG. 8, the actual timer value that is set for the session time by the server 150 is used, and thus the timing of the wireless activation by the session maintenance operation in each session is shifted and the wireless activation is performed twenty-four times for 110 seconds.

Figure 9:
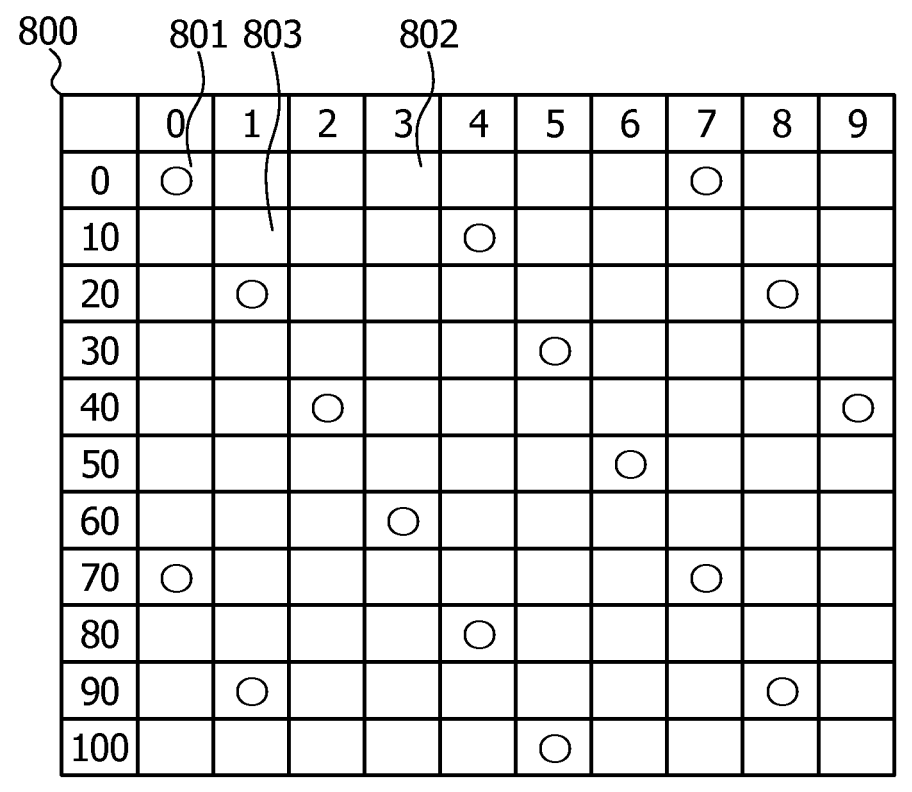

Timing of the Wireless Activation after the Redefinition of the Session Timer According to the Embodiment FIG. 9 is a diagram illustrating one example of the timing of the wireless activation after the redefinition of the session timer according to the embodiment. In FIG. 9, the same portion as that illustrated in FIG. 8 is given the same reference numeral, and a description thereof is omitted. The wireless activation timing 800 that is illustrated in FIG. 9 indicates a timing at which the UE 110 performs the wireless activation by the session maintenance operation after the redefinition of the session timer is performed.

With the redefinition of the session timer, the periodicity of the session maintenance operation in each session in the UE 110 is set to multiples (the periodicity×n) of a periodicity value that is set for the UE 110. In an example that is illustrated in FIG. 9, the periodicity value that is set for the UE 110 is set to 7. For this reason, the UE 110 performs the wireless activation at the 0-th second, the seventh second, the fourteenth second, the twenty-first second, and so forth from the reference timing 801 in the wireless activation timing 800, and performs the session maintenance operation of each session that is established by the UE 110, in at least any one of these wireless activation operations.

In the example that is illustrated in FIG. 9, the wireless activation is performed fifteen times for 110 seconds. In this manner, with the redefinition of the session timer, the utilization efficiency of the radio resource in the session maintenance can be improved without reducing the number of times that the wireless activation indispensable for the session maintenance operation in each session is performed. For this reason, power saving for the UE 110 can be achieved.

In this manner, the session timer management unit 131a (the transmission periodicity adjustment device) of the MME 130a specifies the time-out time (the actual timer value) that is set for the session by the server 150, for every session that is established by the UE 110. The time-out time is indispensable for maintaining the session that is established by the UE 110, and is the longest periodicity in the transmission of the session maintenance signal by the UE 110. That is, when the periodicity with which the UE 110 transmits the session maintenance signal exceeds the time-out time, the session is discarded.

Furthermore, based on the shortest time-out time among the specified time-out times, the session timer management unit 131a determines the periodicity of the allocation of the radio resource to the transmission of the session maintenance signal by the UE 110. For example, the periodicity of the allocation of the radio resource to the transmission of the session maintenance signal by the UE 110 is determined in such a manner that the periodicity of the allocation is an integer multiple (any one of one time, two times, three times, and so forth) of the shortest time-out time described above.

Then, based on the determined allocation periodicity, the session timer management unit 131a adjusts the transmission periodicity of the session maintenance signal by the UE 110. Accordingly, it is possible to perform the session maintenance operation on multiple sessions during the same period of time, and the number of times that the wireless activation indispensable for the session maintenance operation is performed can be decreased. For this reason, the utilization efficiency of the radio resource in the session maintenance can be improved, and the power saving for the UE 110 can be achieved.

Generation Processing of a Scheduling Map by the Scheduling Control Unit

Figure 10:
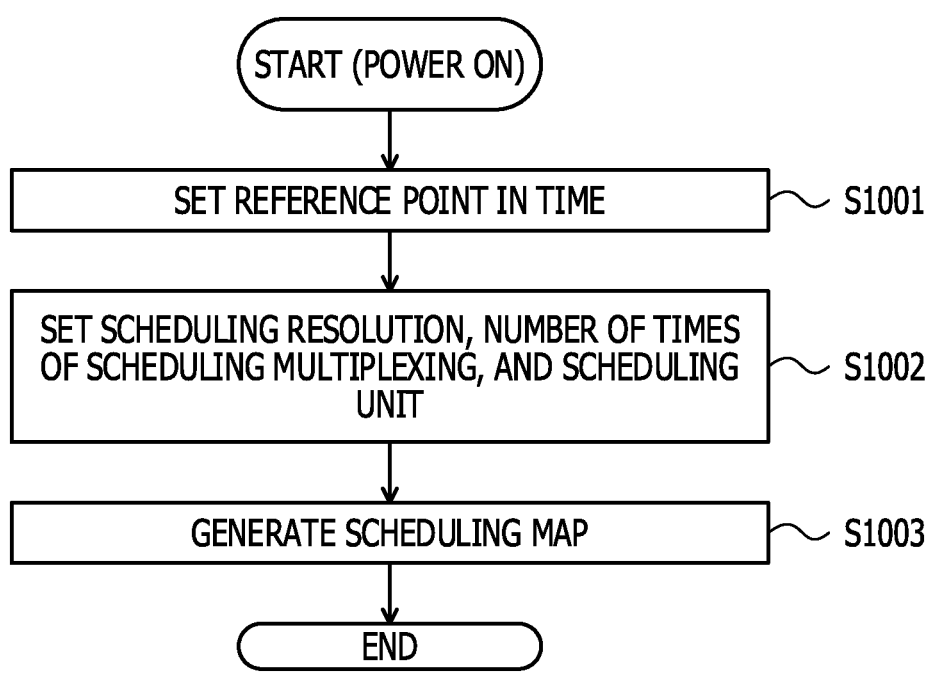
FIG. 10 is a flowchart illustrating one example of generation processing of a scheduling map by a scheduling control unit according to the embodiment.

FIG. 10 is a flowchart illustrating one example of generation processing of a scheduling map by the scheduling control unit according to the embodiment. In FIG. 10, the generation processing of the scheduling map by the scheduling control unit 121a of the eNB 120a is described. However, the same is also true for the generation processing of the scheduling map by each of the scheduling control units 121b and 121c of the eNBs 120b and 120c, respectively.

The scheduling control unit 121a, for example, performs each step that is illustrated in FIG. 10, as the generation processing of the scheduling map. For example, the scheduling control unit 121a performs each step that is illustrated in FIG. 10 when the UE 110 is powered off. Furthermore, the scheduling control unit 121a may also perform each step that is illustrated in FIG. 10 at the time of reconstruction of the scheduling map that will be described below.

First, the scheduling control unit 121a sets a reference point in time (Step S1001). The reference point in time indicates a time (timing) of the 0-th second in the scheduling map. For example, the reference point in time corresponds to the reference timing 801 that is illustrated in FIG. 8. The reference point in time that is set in Step S1001, for example, can be stored in advance in a memory (for example, the memory 302 that is illustrated in FIG. 3) of the eNB 120a.

Furthermore, the scheduling control unit 121a sets a scheduling resolution, the number of times of scheduling multiplexing, and a scheduling unit of the scheduling map (Step S1002). The scheduling resolution is a unit time for allocating one item of UE in the scheduling map. The scheduling control unit 121a creates the scheduling map in which the UE is possible to allocate with the scheduling resolution (a time unit). As one example, the scheduling resolution can be set to one second.

The number of times of scheduling multiplexing is the number of planes of the scheduling map. The number of planes of the scheduling map is the number of items of UE that are possible to allocate at the same timing. For example, in a case where the number of times of scheduling multiplexing is 2, it is possible for two items of UE to perform a session instruction operation at the same timing.

The scheduling unit is a size (a maximum time axis) of the scheduling map. The scheduling control unit 121a divides a time resource by the scheduling unit, and applies allocation by the scheduling map to each of the time resources that results from the division. As one example, the scheduling unit can be made to be 60 seconds.

The scheduling resolution, the number of times of scheduling multiplexing, and the scheduling unit that are set in Step S1002, for example, can be stored in advance in the memory (for example, the memory 302 that is illustrated in FIG. 3) of the eNB 120a. Furthermore, for example, when it comes to the reconstruction of the scheduling map that will be described below, the scheduling map can be reconstructed by changing the scheduling resolution, the number of times of scheduling multiplexing, and the scheduling unit that are set in Step S1002.

Next, the scheduling control unit 121a generates the scheduling map using each parameter of the scheduling map that is set in Steps S1001 and S1002 (Step S1003), and ends a scheduling-map generation processing sequence. Then, the scheduling control unit 121a performs the scheduling of the session maintenance protocol in each item of UE under the control of the eNB 120a, using the scheduling map that is generated in Step S1003.

Figure 11:
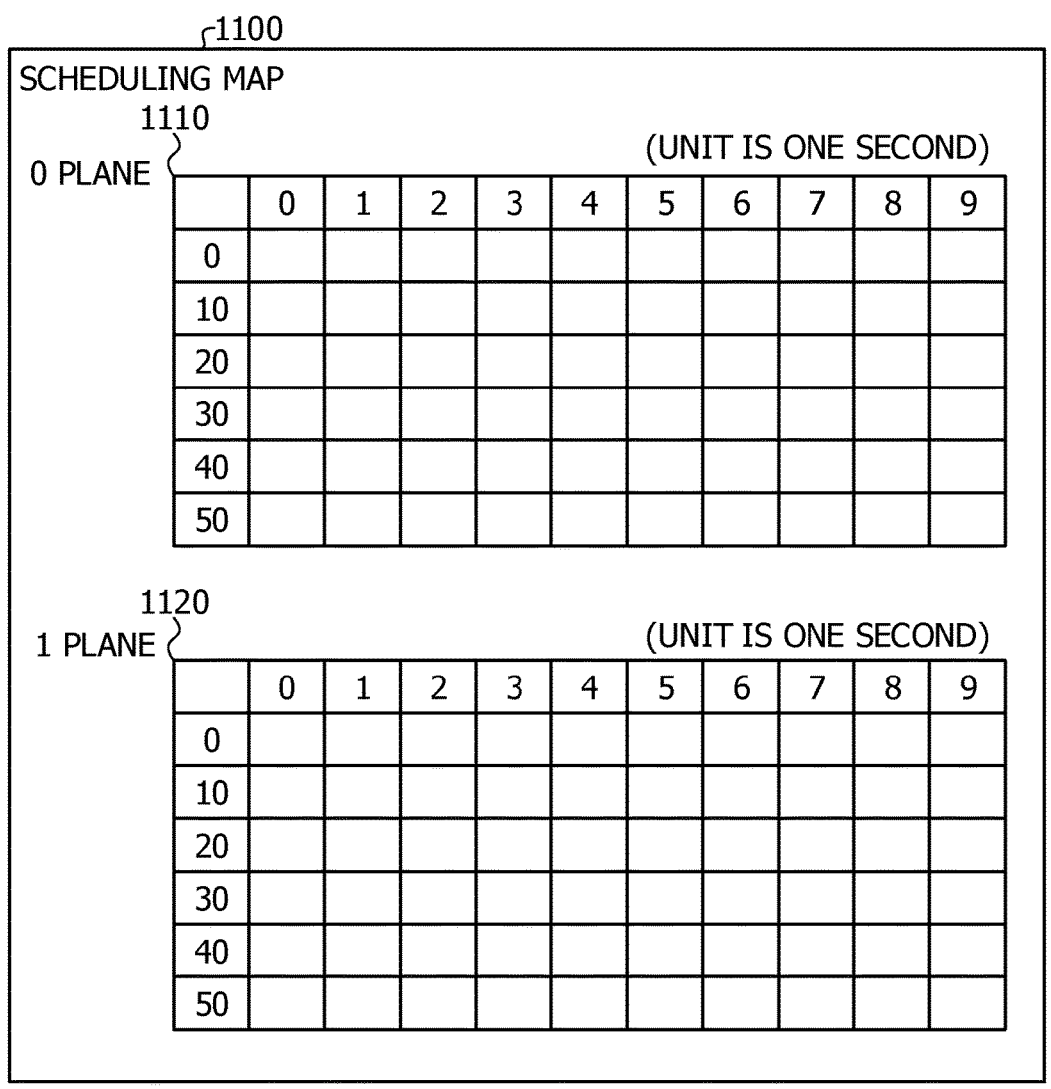
FIG. 11 is a diagram illustrating one example of the scheduling map that is generated by the scheduling control unit according to the embodiment.

Scheduling Map that is Generated by the Scheduling Control Unit According to the Embodiment FIG. 11 is a diagram illustrating one example of the scheduling map that is generated by the scheduling control unit according to the embodiment. The scheduling control unit 121a generates, for example, a scheduling map 1100 that is illustrated in FIG. 11, for example, by performing each step that is illustrated in FIG. 10. The scheduling map 1100 is a scheduling map in a case where the scheduling resolution is made to be one second, where the number of times of scheduling multiplexing is made to be 2, and where the scheduling unit is made to be 60 seconds. In the scheduling map 1100, as is the case with the wireless activation timing 800 that is illustrated in FIG. 8, the horizontal direction indicates a one second unit, and the vertical direction indicates a ten second unit.

Furthermore, because the number of times of scheduling multiplexing is 2, the scheduling map 1100 has a 0 plane 1110 and a 1 plane 1120. Furthermore, because the scheduling resolution is one second, and the scheduling unit is 60 seconds, each of the 0 plane 1110 and the 1 plane 1120 has sixty units that are available for allocating one second.

The scheduling control unit 121a maps each item of UE to the scheduling map 1100. Then, each item of UE operates in accordance with the scheduling map 1100 to which each item of UE is mapped, and thus the UE in which the number of times of scheduling multiplexing is exceeded can be made not to perform the session maintenance operation at the same timing.

Scheduling by the Scheduling Control Unit According to the Embodiment

FIG. 12 is a diagram illustrating one example of the scheduling by the scheduling control unit according to the embodiment. When the information on the UE is notified from the session timer management unit 131a, the scheduling control unit 121a allocates the corresponding UE to a block that is unoccupied in the scheduling map 1100 which is retained. At this point, initial scheduling for the scheduling map 1100 is described. For this reason, the 0 plane 1110 and the 1 plane 1120 of the scheduling map 1100 are both unoccupied. Therefore, the scheduling control unit 121a first performs mapping on the 0 plane 1110.

For example, when the information on UE #1 in the information table 600 that is illustrated in FIG. 7 is notified from the session timer management unit 131a, the scheduling control unit 121a performs the mapping as illustrated in FIG. 12. That is, because a 0-th second block from the reference point in time in the 0 plane 1110 is unoccupied, the scheduling control unit 121a first allocates UE #1 to the 0-th second block from the reference point in time in the 0 plane 1110. With selection of the block (a starting block) to which UE #1 is first allocated, the allocation of the timing of the session maintenance protocol to UE #1 is determined.

Then, the scheduling control unit 121a allocates UE #1 at every periodicity value (seven seconds) of UE #1 from the 0-th second block from the reference point in time in the 0 plane 1110. As a result, UE #1 is allocated to each of the 0-th second block, the seventh second block, the fourteenth second block, the twenty-first second block, and so forth from the reference point in time in the 0 plane 1110.

Information that the Scheduling Control Unit According to the Embodiment Notifies the Session Timer Notification Unit of FIG. 13 is a diagram illustrating one example of a result of the scheduling that the scheduling control unit according to the embodiment notifies the session timer notification unit of. The scheduling control unit 121a of the eNB 120a, for example, notifies the session timer notification unit 112e of the UE 110 of a scheduling result 1300 that is illustrated in FIG. 13.

In addition to the information on the UE #1 in the information table 600 that is illustrated in FIG. 7, the scheduling result 1300 includes the reference point in time, the scheduling resolution, the scheduling unit, and the starting block. In an example that is illustrated in FIG. 13, the reference point in time is 2015/01/01 00:00:00:000. Moreover, 2015/01/01/00:00:00:000 indicates 00 o'clock 00 minutes and 00 seconds 000 millisecond, Jan. 1, 2015. The starting block is a block to which the UE 110 is first allocated in the scheduling map 1100.

Based on the scheduling result 1300, the UE 110 that receives the scheduling result 1300 specifies a point in time at which the starting block×the scheduling resolution has elapsed from the reference point in time, as a starting point. Then, the UE 110 performs the processing of the session maintenance protocol with a periodicity of the periodicity value×the report unit from the specified starting point.

In the example that is illustrated in FIG. 13, the UE 110 specifies a point in time (2015/01/01 00:00:00:000) at which the starting block (0)×the scheduling resolution (1 second) has elapsed from the reference point in time (2015/01/01 00:00:00:000), as the starting point. Then, the UE 110 performs the processing of the session maintenance protocol with a periodicity of the periodicity value (seven seconds)× the report unit (2)=14 seconds from the starting point (2015/01/01 00:00:00:000) in the session of timer #1.

Furthermore, the UE 110 performs the processing of the session maintenance protocol with a periodicity of the periodicity value (seven seconds)×the report unit (4)=28 seconds from the starting point (2015/01/01 00:00:00:000) in the session of timer #2. Furthermore, the UE 110 performs the processing of the session maintenance protocol with a periodicity of the periodicity value (seven seconds)×the report unit (1)=7 seconds from the starting point (2015/01/01 00:00:00:000) in the session of timer #3.

Scheduling in a Case where the Information on the UE is Added by the Scheduling Control Unit According to the Embodiment FIGS. 14 and 15 are diagrams, each illustrating one example of the scheduling in a case where the information on the UE is added by the scheduling control unit according to the embodiment. For example, in a state where, as illustrated in FIG. 12, the scheduling is performed, the session timer management unit 131a is made to notify the scheduling control unit 121a of UE information 1400 on the UE #2 that is illustrated in FIG. 14. In this case, the scheduling control unit 121a performs the mapping, as illustrated in FIG. 15, on the scheduling map 1100 and thus performs the scheduling.

As a result of the scheduling that is illustrated in FIG. 12, UE #1 is already allocated to the 0-th second block from the reference point in time in the 0 plane 1110, and the first second block from the reference point in time in the 0 plane 1110 is unoccupied. For this reason, the scheduling control unit 121a first allocates UE #2 to the first second block in the 0 plane 1110. Therefore, the first second block in the 0 plane 1110 is the starting block for UE #2.

Then, the scheduling control unit 121a allocates UE #2 at every periodicity value (six seconds) of UE #2 from the second second block in the 0 plane 1110. At this time, UE #1 is already allocated to the seventh second block and the forty-ninth second block from the reference point in time, among blocks that correspond to every periodicity value (six seconds) of UE #2 from the second second block of the 0 plane 1110. For this reason, the scheduling control unit 121a allocates UE #2 to the seventh second block and the forty-ninth second block from the reference point in time, in the 1 plane 1120 of the scheduling map 1100.

However, the scheduling control unit 121a performs the scheduling in such a manner that the number of items of UE that are allocated at the same timing does not exceed the number of times of scheduling multiplexing. For example, when the allocation of a new item of UE is performed, in a case where the timer that is allocated to that item of UE is allocated to another item of UE even in both of the 0 plane 1110 and the 1 plane 1120, the scheduling control unit 121a changes the starting block for that item of UE. Furthermore, in such a case, the scheduling control unit 121a may perform the reconstruction of the scheduling map. Furthermore, in such a case, the scheduling control unit 121a may increase the number of times of scheduling multiplexing (the number of planes of the scheduling map 1100).

The scheduling is performed in this manner, and thus the session maintenance operation within a cell that is covered by the eNB 120a is equalized. In an example that is illustrated in FIG. 15, two items of UE, that is, UE #1 and UE #2 perform the session maintenance operation at the same time at the seventh second and the forty-ninth second from the reference point in time, but at a different time, only one item of UE performs the session maintenance operation, or none of two items of UE performs the session maintenance operation.

Correction of the Scheduling by the Scheduling Control Unit According to the Embodiment FIGS. 16 and 17 are diagrams, each illustrating one example of correction of the scheduling by the scheduling control unit according to the embodiment. For example, in the state where, as illustrated in FIG. 15, the scheduling is performed, the session timer management unit 131a is made to notify the scheduling control unit 121a of the UE information on the UE #3. Furthermore, the periodicity value that is indicated by the UE information is 2. In this case, the scheduling control unit 121a performs the mapping, as illustrated in FIG. 16, on the scheduling map 1100 and thus performs the scheduling.

As the result of the scheduling that is illustrated in FIG. 15, UE #1 and UE #2 are already allocated to the 0-th second block and the first second block, respectively, from the reference point in time in the 0 plane 1110. Furthermore, the second second block from the reference point in time in the 0 plane 1110 is unoccupied. For this reason, the scheduling control unit 121a first allocates UE #3 to the second second block from the reference point in time in the 0 plane 1110. Therefore, the second second group in the 0 plane 1110 is the starting block for UE #3.

Then, the scheduling control unit 121a allocates UE #3 at every periodicity value (two seconds) of UE #3 from the second second block from the reference point in time in the 0 plane 1110. At this time, UE #1 or UE #2 is already allocated to the fourteenth second, the twenty-eighth second, the forty-second second, and the fifty-sixth second, among blocks that correspond to every two seconds after the second second from the reference point in time in the 0 plane 1110. For this reason, the scheduling control unit 121a allocates UE #3 to the fourteenth second block, the twenty-eighth second block, the forty-second second block and the fifty-sixth second block from the reference point in time, in the 1 plane 1120 of the scheduling map 1100.

In this case, UE #3 is not allocated for a duration 1601 of three seconds between a 58-second block from the reference point in time and the second second block from the reference point in time. For this reason, the scheduling control unit 121a, as illustrated in FIG. 17, allocates UE #3 even to a block 1701 that is unoccupied for the duration 1601.

The correction of the scheduling is performed in this manner, and thus in each item of UE, the periodicity of the session maintenance operation can be made not to exceed the periodicity value. In a case where the correction of the scheduling is performed in this manner, the scheduling control unit 121a, for example, further stores a correction value indicating the block 1701, in the scheduling result 1300 that is illustrated in FIG. 13. As one example, the correction value indicating the block 1701 can be made to be the number (59) of positive seconds from the reference point in time. Furthermore, the correction value indicating the block 1701 may be made to be the number (1) of negative seconds from the reference point in time.

Figure 18:
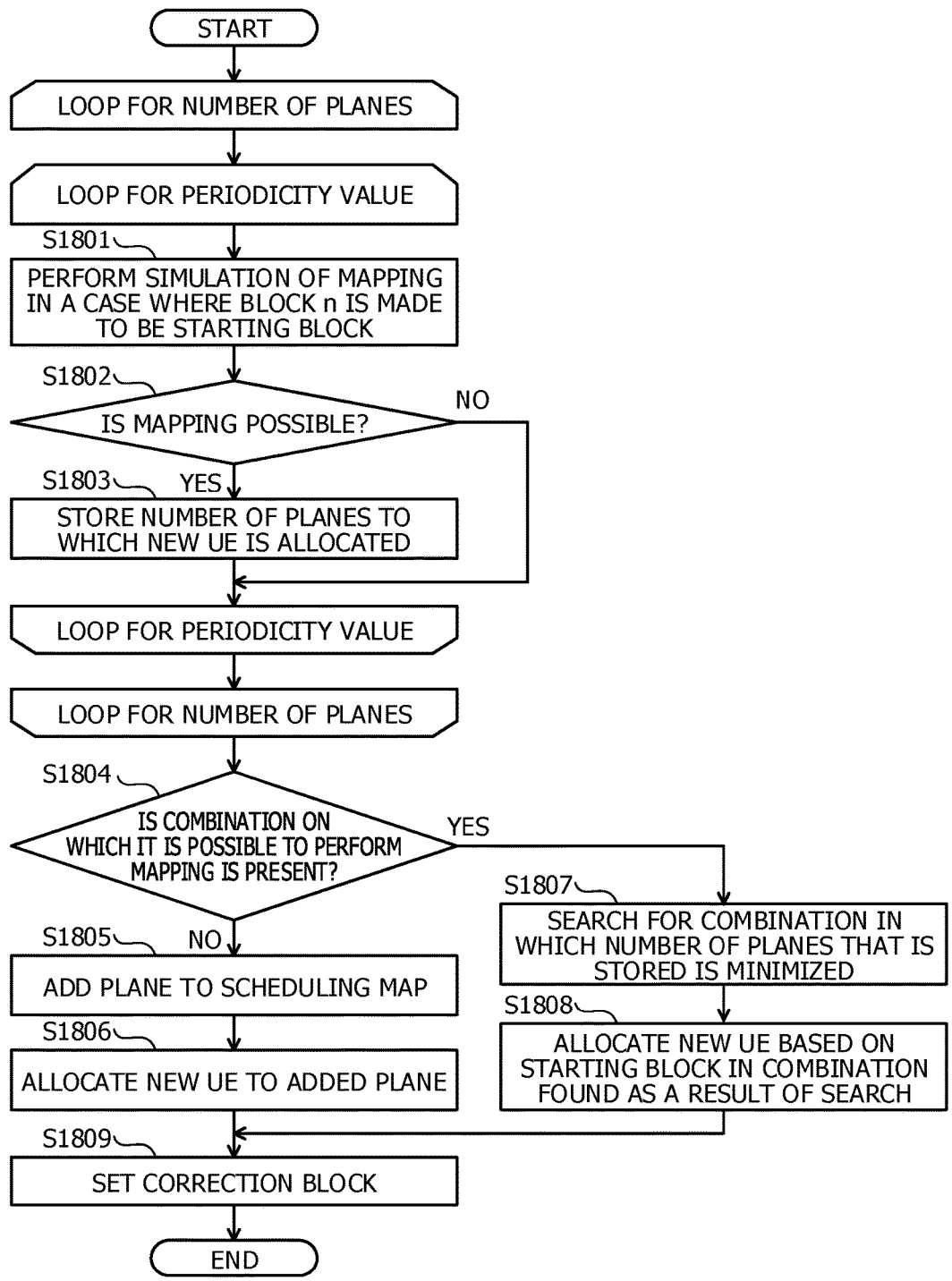
FIG. 18 is a flowchart illustrating one example of scheduling processing by the scheduling control unit according to the embodiment.

Scheduling Processing by the Scheduling Control Unit According to the Embodiment FIG. 18 is a flowchart illustrating one example of scheduling processing by the scheduling control unit according to the embodiment. In a case where the addition of the UE is notified from the session timer management unit 131a, the scheduling control unit 121a performs each step that is illustrated in FIG. 18, as the scheduling processing.

First, the scheduling control unit 121a performs processing in each of Steps S1801 to S1803 with each of planes of the scheduling map 1100 in current use as a target (a loop for the number of planes). Additionally, the scheduling control unit 121a performs the processing in each of Steps S1801 to S1803 from the initial block in a current target plane in the scheduling map 1100, with each of the blocks for a periodicity value of new UE in the same plane as a target (a loop for the periodicity value).

For example, the planes of the scheduling map 1100 that is currently used by the scheduling control unit 121a are the 0 plane 1110 and the 1 plane 1120, and the periodicity value of the new UE is made to be five seconds. In this case, the scheduling control unit 121a performs the processing in each of Steps S1801 to S1803 on eight combinations of each plane (the 0 plane 1110 and the 1 plane 1120) and each block (the 0-th second to fourth second blocks).

First, the scheduling control unit 121a performs simulation of the mapping in a case where a target block n in a target plane in the scheduling map 1100 is made to be the starting block to which new UE is first allocated (Step S1801). For example, in a case where new UE is allocated to each block that corresponds to every periodicity value of the new UE from the target block n, and where an overlap between the allocation of the new UE and the allocation of different UE occurs, if a different plane is unoccupied, the scheduling control unit 121a performs the allocation using the different plane.

Then, in a case where the allocation is performed at every periodicity value of the new UE using the plane of the scheduling map 1100 that is currently used, the scheduling control unit 121a determines that the mapping is possible. Furthermore, in a case where even though all the planes of the scheduling map 1100 that is currently used are used, the allocation is not performed at every periodicity value of the new UE, the scheduling control unit 121a determines that the mapping is impossible.

Next, the scheduling control unit 121a determines whether or not the mapping is possible in the simulation in Step S1801 (Step S1802). In a case where the mapping is possible in the simulation (No in Step S1802), the scheduling control unit 121a ends the processing in each of Steps S1801 to S1803 on the combination of the target plane and the block.

In a case where in Step S1802, the mapping is possible in the simulation (Yes in Step S1802), the scheduling control unit 121a proceeds to Step S1803. That is, the scheduling control unit 121a stores the number of planes to which the new UE is allocated in the simulation in Step S1801, in the memory (Step S1803). Then, the scheduling control unit 121a ends the processing in each of Steps S1801 to S1803 on the combination of the target plane and the block.

When the processing in each of Steps S1801 to S1803 on all the combinations of the planes and the blocks is ended, the scheduling control unit 121a proceeds to Step S1804. That is, the scheduling control unit 121a determines whether or not a combination on which it is possible to perform the mapping in the simulation in Step S1801 is present, among all the combinations of the planes and the blocks (Step S1804).

In a case where in Step S1804, the combination on which it is possible to perform the mapping is not present (No in Step S1804), the scheduling control unit 121a adds a plane to the scheduling map 1100 (Step S1805).

Next, the scheduling control unit 121a allocates new UE to the plane of the scheduling map 1100 that is added in Step S1805 (Step S1806), and proceeds to Step S1809. However, in Step S1806, the scheduling control unit 121a may allocate new UE not only to the plane that is added in Step S1805, but also to the plane of the scheduling map 1100 before the addition in Step S1805.

In a case where in Step S1804, the combination on which it is possible to perform the mapping is present (Yes in Step S1804), the scheduling control unit 121a searches for a combination in which the number of planes that is stored in Step S1803 is minimized (Step S1807). Next, the scheduling control unit 121a allocates new UE with the block in the combination found as a result of the search in Step S1807 as the starting block (Step S1808).

Next, if a correction block is present for the new UE, the scheduling control unit 121a sets a correction block (Step S1809) and ends a scheduling processing sequence. For example, in a case where in the scheduling map 1100, an interval for the allocation of the new UE is a duration, that is, a duration that is greater than the periodicity value of the new UE is present, the scheduling control unit 121a allocates the new UE to a block that is unoccupied for the duration. The duration that is not greater than the periodicity value of the new UE, for example, is the duration 1601 in FIG. 16. The block that is unoccupied for the duration, for example, is the block 1701 in FIG. 17.

In this manner, the scheduling control unit 121a, for example, performs the simulation on all cases (combinations) that can be assumed, and performs the scheduling by calculating a case in which the number of planes in use is not smaller than 1.

Other Examples of the Scheduling by the Scheduling Control Unit

The scheduling for allocating the UE that has a different periodicity value in one type of scheduling map is described, but the scheduling for providing the scheduling map at every periodicity value (for example, every prime number) may be performed.

For example, the scheduling control unit 121a generates the scheduling map for each of prime numbers such as 2, 3, 5, 7, 11, and so forth. Then, when scheduling the UE, the scheduling control unit 121a maps the UE with respect to the scheduling map for a prime number that corresponds to the periodicity value of the UE.

The scheduling map is provided at the periodicity value (every prime number) in this manner, and thus the construction or the reconstruction of the scheduling map is made easy. When providing the scheduling map at the periodicity value (every prime number), the scheduling unit/the scheduling resolution is made to be a multiple of the periodicity value (prime number). Accordingly, the allocation of the UE is at a fixed interval and thus a correction point is unnecessary. As a result, an optimal arrangement of items of UE within the scheduling map is possible.

FIG. 19 is a diagram illustrating one example of the scheduling map that corresponds to a prime number which is applicable to the embodiment. A scheduling map 1900 that is illustrated in FIG. 19 is a scheduling map that corresponds to a prime number 11, for the UE of which the periodicity value is 11×n seconds (n is an integer greater than 1). The scheduling unit of the scheduling map 1900 is 66 seconds, and the scheduling resolution of the scheduling map 1900 is one second. In an initial state, only a 0 plane 1910 is set for the scheduling map 1900.

In a case where the periodicity value of the UE that the session timer management unit 131a notifies the scheduling control unit 121a of is 11×n seconds (for example, 66 seconds), the scheduling map 1900 is used.

Figure 20:

FIG. 20 a diagram illustrating one example of the periodicity value of the UE that the session timer management unit according to the embodiment notifies the scheduling control unit of. FIGS. 21 to 24 are diagrams, each illustrating one example of the mapping to the scheduling map that corresponds to the prime number that is applicable to the embodiment. For example, the session timer management unit 131a is made to notify the scheduling control unit 121a of the periodicity values (11×n seconds in all) of UE #1 to UE #10 in order that is illustrated in a table 2000 which is illustrated in FIG. 20. In this case, the scheduling control unit 121a, for example, performs the mapping on the 0 plane 1910 of the scheduling map 1900 as illustrated in FIG. 21. In this manner, because all the periodic values of UE #1 to UE #10 are 11×n seconds, each of UE #1 to UE #10 can be allocated at a fixed interval to the 0 plane 1910 of the scheduling map 1900.

In this state, the session timer management unit 131a is made to notify the scheduling control unit 121a of the addition of UE #11 (the periodicity value of 55 seconds). In this case, the scheduling control unit 121a performs the mapping on the 0 plane 1910 of the scheduling map 1900 as illustrated in FIG. 22. That is, the scheduling control unit 121a allocates UE #11 to the tenth second block and the sixty-fifth second block that are unoccupied in the 0 plane 1910 of the scheduling map 1900 that is illustrated in FIG. 21.

In this state, the session timer management unit 131a is made to notify the scheduling control unit 121a of the addition of UE #12 (the periodicity value of 44 seconds). In this case, the scheduling control unit 121a makes a search for a block that is unoccupied in the 0 plane 1910 of the scheduling map 1900 that is illustrated in FIG. 22.

First, the scheduling control unit 121a searches for a column that is currently used with a periodicity of 44 seconds. In an example that is illustrated in FIG. 22, a seventh-second column corresponds to a result of the search. Next, the scheduling control unit 121a searches for a block that is unoccupied within 7+44 seconds in the seventh-second column that is found as a result of the search. In the example that is illustrated in FIG. 22, for example, the (7+11)-th second block corresponds to a result of the search.

Next, the scheduling control unit 121a determines whether or not UE #12 can be allocated based on the periodicity value (forty-four seconds) from the (7+11)-th second block that is found as a result of the search. In the example that is illustrated in FIG. 22, UE #12 can be allocated to the (7+11)-th second block and the (7+55)-th second block that are found as a result of the search.

At this point, because the 0 plane 1910 of the scheduling map 1900 in which the scheduling unit is sixty-six is used, UE #12 has to be allocated to a block that corresponds to a number that results from adding 1 to a quotient of 66/44. In contrast, as described above, UE #12 can be allocated to two blocks, that is, the (7+11)-th second block and the (7+55)-th second block. For this reason, the scheduling control unit 121a, as illustrated in FIG. 23, UE #12 is allocated to two blocks, that is, the (7+11)-th second block and the (7+55)-th second block in the 0 plane 1910 of the scheduling map 1900.

In this state, the session timer management unit 131a is made to notify the scheduling control unit 121a of the addition of UE #13 (the periodicity value of 44 seconds). In this case, the scheduling control unit 121a makes a search for a block that is unoccupied in the 0 plane 1910 of the scheduling map 1900 that is illustrated in FIG. 23.

First, the scheduling control unit 121a searches for a column that is currently used with a periodicity of 44 seconds. In the example that is illustrated in FIG. 23, the seventh-second column corresponds to a result of the search. Next, the scheduling control unit 121a searches for the block that is unoccupied within 7+44 seconds in the seventh-second column that is found as the result of the search. In the example that is illustrated in FIG. 23, for example, the (7+22)-th second block corresponds to a result of the search.

Next, the scheduling control unit 121*a* determines whether or not UE #13 can be allocated based on the periodicity value (44 seconds) from the (7+22)-th second block that is found as the result of the search. In the example that is illustrated in FIG. 23, because UE #8 is already allocated to the (7+0)-th second block at which 44 seconds have elapsed from the (7+22)-th second block, the allocation is not performed. For this reason, UE #13 can be allocated to one block ((7+22)-th second block).

At this point, because the 0 plane 1910 of the scheduling map 1900 in which the scheduling unit is sixty-six is used, UE #13 has to be allocated to the block that corresponds to the number that results from adding 1 to the quotient of 66/44. In contrast, as described above, UE #13 can be allocated to one block. For this reason, the scheduling control unit 121*a* determines that the seventh-second column is not available. Next, the scheduling control unit 121*a* determines in the same manner whether or not the eighth and later second columns are also available, but in the example that is illustrated in FIG. 23, the eighth and later second columns are not available.

For this reason, the scheduling control unit 121*a*, as illustrated in FIG. 24, adds the 1 plane 1920 to the scheduling map 1900, and allocates UE #13 to the 1 plane 1920. In an example that is illustrated in FIG. 24, the scheduling control unit 121*a* allocates UE #13 to each of the 0-th second block and the forty-fourth second block in the 1 plane 1920.

Furthermore, in a case where the addition of the UE of which the periodicity value (for example, 77 seconds or 88 seconds) is 11×n seconds and greater than 66 seconds is notified from the session timer management unit 131*a*, the scheduling control unit 121*a* performs the reconstruction of the scheduling map. For example, the scheduling control unit 121*a* expands the scheduling unit/the scheduling resolution in the scheduling map 1900.

The scheduling map 1900 that corresponds to 11 that is a prime number is described, but the scheduling control unit 121*a* uses the scheduling map even for multiple prime numbers (for example, 2, 3, 5, 7, and so forth) in the same manner. Then, the UE is allocated to the scheduling map corresponding to a prime number (which, in a case where the periodicity is a prime number, refers to this prime number) that is the periodicity value of the UE that is notified from the session timer management unit 131*a*.

Figure 25:
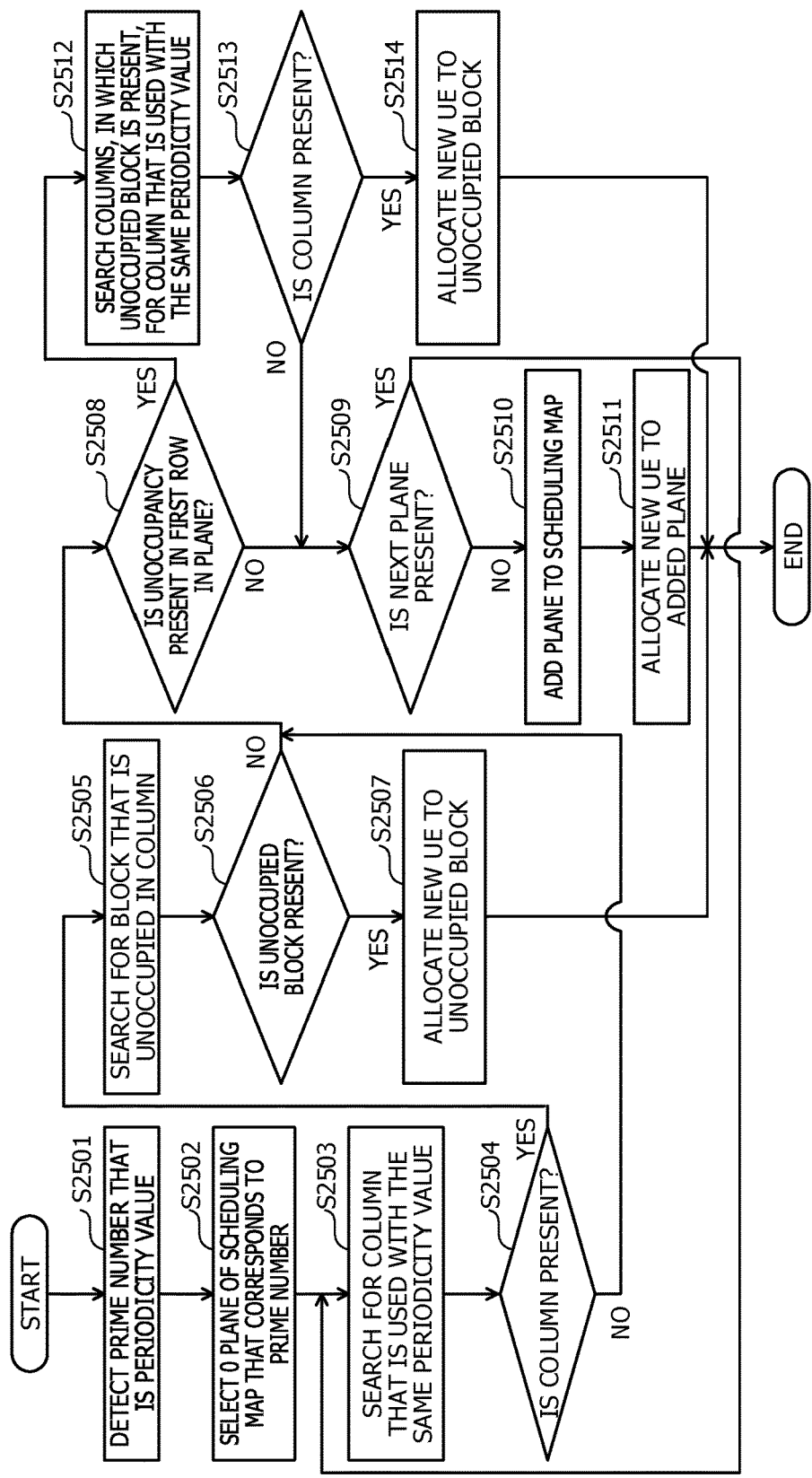
FIG. 25 is a flowchart illustrating another example of the scheduling processing by the scheduling control unit according to the embodiment.

Scheduling Processing by the Scheduling Control Unit According to the Embodiment FIG. 25 is a flowchart illustrating another example of the scheduling processing by the scheduling control unit according to the embodiment. In FIG. 25, the scheduling processing by the scheduling control unit 121*a* for performing the scheduling that is illustrated in FIGS. 19 to 24. First, the scheduling control unit 121*a* calculates a prime number that is the periodicity value of the new UE, with factorization in prime numbers (Step S2501).

Next, the scheduling control unit 121*a* selects a 0 plane (an initial plane) of the scheduling map corresponding to the prime number that is calculated in Step S2501 (Step S2502). Next, the scheduling control unit 121*a* searches for a column that is used with the same periodicity value as the periodicity value of the new UE in the 0 plane of the scheduling map that is selected in Step S2502 (Step S2503).

Next, the scheduling control unit 121*a* determines whether or not the column that is used with the same periodicity value as the periodicity value of the new UE is present as a result of the search in Step S2503 (Step S2504).

In a case where it is determined that the column which is used with the same periodicity value is not present (No in Step S2504), the scheduling control unit 121*a* proceeds to Step S2508.

In a case where it is determined in Step S2504 that the column which is used with the same periodicity value is present (Yes in Step S2504), the scheduling control unit 121*a* searches a block that is unoccupied in the column (Step S2505).

Next, the scheduling control unit 121*a* determines whether or not a block that is unoccupied is present as a result of the search in Step S2505 (Step S2506). In a case where it is determined that the block which is unoccupied is present (Yes in Step S2506), the scheduling control unit 121*a* allocates the new UE to the block that is unoccupied (Step S2507) and ends the scheduling processing sequence.

In a case where it is determined in Step S2506 that the block which is unoccupied is not present (No in Step S2506), the scheduling control unit 121*a* determines whether or not an unoccupied block is present in the first row (for example, a 0+row in the scheduling map 1900 that is illustrated in FIG. 19) in the plane that is selected in Step S2502 (Step S2508).

In a case where in Step S2508, the unoccupied block is not present in the first low (No in Step S2508), the scheduling control unit 121*a* proceeds to Step S2509. That is, the scheduling control unit 121*a* determines whether or not the next plane is present in the scheduling map that corresponds to the prime number that is calculated in Step S2501 (Step S2509).

In a case where it is determined in Step S2509 that the next plane is not present (No in Step S2509), the scheduling control unit 121*a* adds a new plane to the scheduling map that corresponds to the prime number that is calculated in Step S2501 (Step S2510). Next, the scheduling control unit 121*a* allocates the new UE to the plane that is added in Step S2510 (Step S2511), and ends the scheduling processing sequence.

In a case where it is determined in Step S2509 that the next plane is present (Yes in Step S2509), the scheduling control unit 121*a* selects the next plane and returns to Step S2503. In this case, the scheduling control unit 121*a* performs processing in each of Step S2503 and subsequent steps with the next plane as a target.

In a case where in Step S2508, the unoccupied block is present in the first row (Yes in Step S2508), the scheduling control unit 121*a* searches columns, in which the unoccupied block in the first row is present, for a column that is used with the same periodicity value (Step S2512). Next, the scheduling control unit 121*a* determines whether or not the column that is used with the same periodicity value is present among the columns in which the unoccupied block in the first row is present, as a result of the search in Step S2512 (Step S2513).

In a case where it is determined in Step S2513 that the column that is used with the same periodicity value is not present (No in Step S2513), the scheduling control unit 121*a* proceeds to Step S2509. In a case where it is determined that the column that is used with the same periodicity value is present (Yes in Step S2513), the scheduling control unit 121*a* proceeds to Step S2514. That is, the scheduling control unit 121*a* allocates the new UE to a block that is unoccupied in the column that is used with the same periodicity value (Step S2514), and ends the scheduling processing sequence. In a case where in Step S2514, the new UE is not allocated, with the periodicity value of the new UE, to a unoccupied block, for example, proceeding to Step S2510 may take place.

As illustrated in FIG. 25, in a case where a prime number that is the periodic value is specified, where a column that is used at the same time is specified, and where a region that is possible to set is detected from the specified prime number and column, the scheduling control unit 121a allocates the UE to the region.

Accordingly, for example, even if the simulation is not performed on all cases (combinations) that can be assumed as is the case with the scheduling processing that is illustrated in FIG. 18, the scheduling can be performed. Furthermore, the scheduling control unit 121a generates the scheduling map based on the prime number, makes the scheduling unit a multiple of a prime number, and thus can simplify scheduling processing. For this reason, an amount of processing in the scheduling can be reduced.

Operation of the Scheduling Control Unit at the Time of an X2 Handover

When the X2 handover occurs in the UE 110, the scheduling control unit that performs scheduling of the UE 110, among the scheduling control units 121a to 121c is changed. For example, when the UE 110 performs the X2 handover from the eNB 120a to the eNB 120b, the scheduling control unit that performs the scheduling of the UE 110 is changed from the scheduling control unit 121a to the scheduling control unit 121b.

In this case, the scheduling control unit 121a performs information transfer by notifying the scheduling control unit 121b of the information on UE #1 among pieces of information on the UE. Furthermore, the scheduling control unit 121a deletes the information on UE #1 among the pieces of information on the UE, from a database of information on the UE in the scheduling control unit 121a. Furthermore, the scheduling control unit 121a also notifies the session timer report unit 151 that the scheduling control unit which performs the scheduling of the UE 110 is changed from the scheduling control unit 121a to the scheduling control unit 121b.

Based on the information that is received from the scheduling control unit 121a, the scheduling control unit 121b updates the scheduling map of the scheduling control unit 121b. Then, the scheduling control unit 121b notifies the session timer notification unit 112e of the UE 110 of a result of the scheduling that is based on the updated scheduling map.

Operation of the Session Timer Management Unit at the Time of an S1 Handover

When S1 handover occurs in the UE 110, the session timer management unit that manages a session timer of the UE 110, of the session timer management units 131a and 131b is changed. For example, when the UE 110 performs the S1 handover from the eNB 120a to the eNB 120c, the session timer management unit that manages the session timer of the UE 110 is changed from the session timer management unit 131a to the session timer management unit 131b.

In this case, the session timer management unit 131a performs the information transfer by notifying the session timer management unit 131b of the information on UE #1 in the information table 600 of the session timer management unit 131a. Furthermore, the session timer management unit 131a deletes the information on UE #1 from the information table 600 of the session timer management unit 131a. Furthermore, the session timer management unit 131a also notifies the session timer report unit 151 that the session time management unit which manages the session timer of the UE 110 is changed from the session timer management unit 131a to the session timer management unit 131b.

Based on the information that is received from the session timer management unit 131a, the session timer management unit 131b updates an information table of the session timer management unit 131b. Then, the session timer management unit 131b notifies the corresponding scheduling control unit among the scheduling control units 121a to 121c and the UE identifier management unit 141 of each piece of information.

Figure 26:
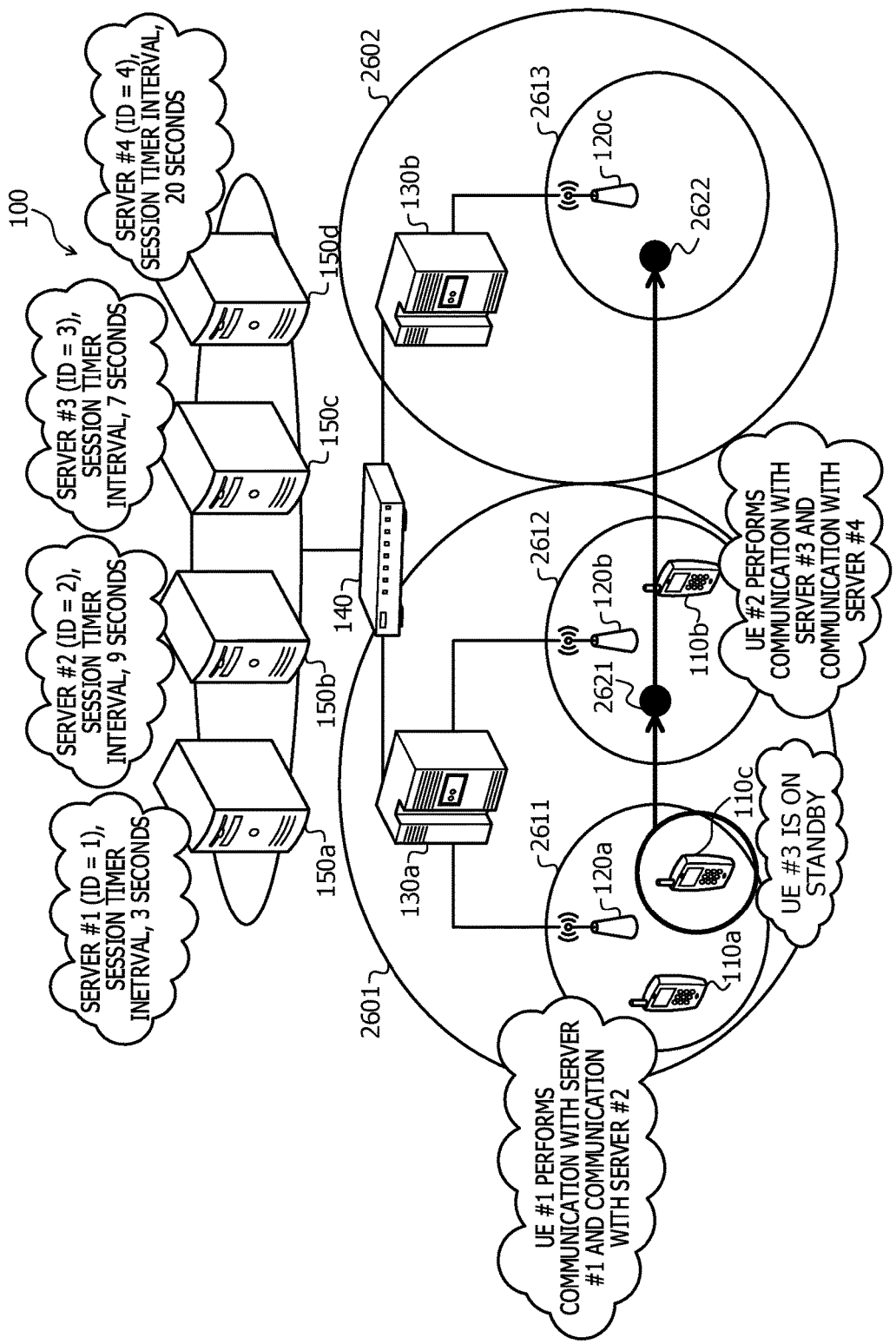
FIG. 26 is a diagram illustrating a specific example of the wireless communication system according to the embodiment.

Specific Example of the Wireless Communication System According to the Embodiment FIG. 26 is a diagram illustrating a specific example of the wireless communication system according to the embodiment. In FIG. 26, the same portion as that illustrated in FIG. 1 is given the same reference numeral, and a description thereof is omitted. Each of the UE 110a to UE 110c (UE #1 to UE #3) that are illustrated in FIG. 26 is mobile equipment that corresponds to the UE 110 that is illustrated in FIG. 1.

Areas 2601 to 2602 that are illustrated in FIG. 26 are areas under the control of the MMEs 130a and 130b, respectively. The eNBs 120a and 120b are included in the area 2601, the eNB 120c is included in the area 2602. Cells 2611 to 2613 are cells that in which the eNBs 120a to 120c are formed, respectively.

Each of servers 150a to 150d (servers #1 to #4) that are illustrated in FIG. 26 is a server that corresponds to the server 150 which is illustrated in FIG. 1. IDs (server identifiers) of The servers 150a to 150d are defined as 1 to 4, respectively. Furthermore, the session timer intervals (the actual timer values) in the servers 150a to 150d are defined as three seconds, nine seconds, seven seconds, and twenty seconds.

In an example that is illustrated in each of FIGS. 27 to 29, the UE 110a (UE #1) performs the communication with the servers 150a and 150b (servers #1 and #2) through the eNB 120a (eNB #1). Furthermore, the UE 110b (UE #2) performs the communication with the servers 150c and 150d (servers #3 and #4) through the eNB 120b (eNB #2).

A case where the UE 110c that is on standby in the cell 2611 starts to perform the communication with the servers 150a to 150d through the eNB 120a and where the UE 110c moves to locations 2621 and 2622 in this order is described referring to FIGS. 27 to 46. The UE 110c moves to the location 2621 and thus a handover from the eNB 120a to the eNB 120b is performed. This handover is a handover within the area 2601, and because of this, is an X2 handover that is accompanied by a change of the MME (the MME 130a) that is a connection destination.

Furthermore, the UE 110c moves from the location 2621 to the location 2622, and thus a handover from the eNB 120b to the eNB 120c is performed. This handover is a handover that occurs across areas (the areas 2601 and 2602), and because of this, is the S1 handover that is accompanied by the change of the MME (from the MME 130a to the MME 130b).

Setting Configuration in UE #1 According to the Embodiment

FIG. 27 is a diagram illustrating one example of setting information in UE #1 according to the embodiment. Setting information 2700 that is illustrated in FIG. 27 indicates information that is set in the UE 110a (UE #1) which is illustrated in FIG. 26. As indicated in the setting information 2700, in the UE 110a, 2015/01/01 00:00:00:000 is set as the reference point in time, one second as the scheduling resolution, sixty seconds as the scheduling unit, 0 as the starting block, and three seconds as the periodicity value.

Furthermore, as indicated in the setting information 2700, in the UE 110a, the correction value of the scheduling is not set. Furthermore, as indicated in the setting information 2700, in the UE 110a, 1 is set as the report unit in a session for the communication with the server 150a (server #1) and 3 as the report unit in a session for the communication with the server 150b (server #2).

Setting Information in UE #2 According to the Embodiment

FIG. 28 is a diagram illustrating one example of setting information in UE #2 according to the embodiment. Setting information 2800 that is illustrated in FIG. 28 indicates information that is set in the UE 110b (UE #2) which is illustrated in FIG. 26. As indicated in the setting information 2800, in the UE 110b, 2015/01/01 00:00:00:000 is set as the reference point in time, one second as the scheduling resolution, sixty seconds as the scheduling unit, 0 as the starting block, and seven seconds as the periodicity value.

Furthermore, as indicated in the setting information 2800, in the UE 110b, the correction value of the scheduling is not set. Furthermore, as indicated in the setting information 2800, in the UE 110b, 1 is set as the report unit in a session for the communication with the server 150c (server #3) and 2 as the report unit in a session for the communication with the server 150d (server #4).

Setting Information in eNB #1 According to the Embodiment

FIG. 29 is a diagram illustrating one example of setting information in eNB #1 according to the embodiment. Setting information 2900 that is illustrated in FIG. 29 indicates information that is set in the eNB 120a (eNB #1) which is illustrated in FIG. 26. As indicated in the setting information 2900, in the eNB 120a, 2015/01/01 00:00:00:000 is set as the reference point in time, one second as the scheduling resolution, and sixty seconds as the scheduling unit.

Furthermore, a 0 plane 2901 of the scheduling in the eNB 120a is included in the setting information 2900. "0" in the 0 plane 2901 indicates that the UE is not allocated, and "1" in the 0 plane 2901 indicates the UE 110a (UE #1) is allocated. In the example that is illustrated in FIG. 29, the UE 110a (UE #1) is allocated to the 0-th second, the third second, the sixth second, the ninth second, and so forth in the 0 plane 2901 of the scheduling map in the eNB 120a.

Setting Information in eNB #2 According to the Embodiment

FIG. 30 is a diagram illustrating one example of setting information in eNB #2 according to the embodiment. Setting information 3000 that is illustrated in FIG. 30 indicates information that is set in the eNB 120b (eNB #2) which is illustrated in FIG. 26. As indicated in the setting information 3000, in the eNB 120b, 2015/01/01 00:00:00:000 is set as the reference point in time, one second as the scheduling resolution, and sixty seconds as the scheduling unit.

Furthermore, a 0 plane 3001 of the scheduling map in the eNB 120b is included in the setting information 3000. "0" in the 0 plane 3001 indicates that the UE is not allocated, and "2" in the 0 plane 3001 indicates the UE 110b (UE #2) is allocated. In the example that is illustrated in FIG. 30, the UE 110b (UE #2) is allocated to the 0-th second, the seventh second, the fourteenth second, the twenty-first second, and so forth in the 0 plane 3001 of the scheduling map in the eNB 120b.

Setting Information in MME #1 According to the Embodiment

FIG. 31 is a diagram illustrating one example of setting information in MME #1 according to the embodiment. Setting information 3100 that is illustrated in FIG. 31 indicates information that is set in the MME 130a (MME #1) which is illustrated in FIG. 26. As indicated in the setting information 3100, an information table 3101 for the UE 110a (UE #1) and an information table 3102 for the UE 110b (UE #2) are included in the setting information 3100. In the example that is illustrated in FIG. 31, the setting information 3100 indicates setting information that is present before the UE 110c makes a connection to the eNB 120a, and an information table for the UE 110c is not included in the setting information 3100.

In the information table 3101, three seconds are set as a periodicity value of the UE 110a. Furthermore, in the information table 3101, three seconds are set as the actual timer value and 1 is set as the report unit for a session between the UE 110a and the server 150a (ID: 1). In the information table 3102, seven seconds are set as a periodicity value of the UE 110b. Furthermore, in the information table 3102, twenty seconds are set as the actual timer value and 2 is set as the report unit for a session between the UE 110b and the server 150b (ID: 2).

In addition to each piece of setting information that is illustrated in each of FIGS. 27 to 31, for example, in the PGW 140, an IP address of the UE 110a or information indicating the MME 130a (MME #1) that is a connection destination of the UE 110a is set as information relating to the UE 110a (UE #1). Furthermore, in the PGW 140, an IP address of the UE 110b or information indicating the MME 130a (MME #1) that is a connection destination of the UE 110b is set as information relating to the UE 110b (UE #2).

Furthermore, in the servers 150a to 150d, session timer intervals (actual timer values) in sessions among the servers 150a to 150d themselves are set. The session timer intervals that are set for the servers 150a to 150d are defined as three seconds, nine seconds, seven seconds, and twenty seconds.

Figure 32:
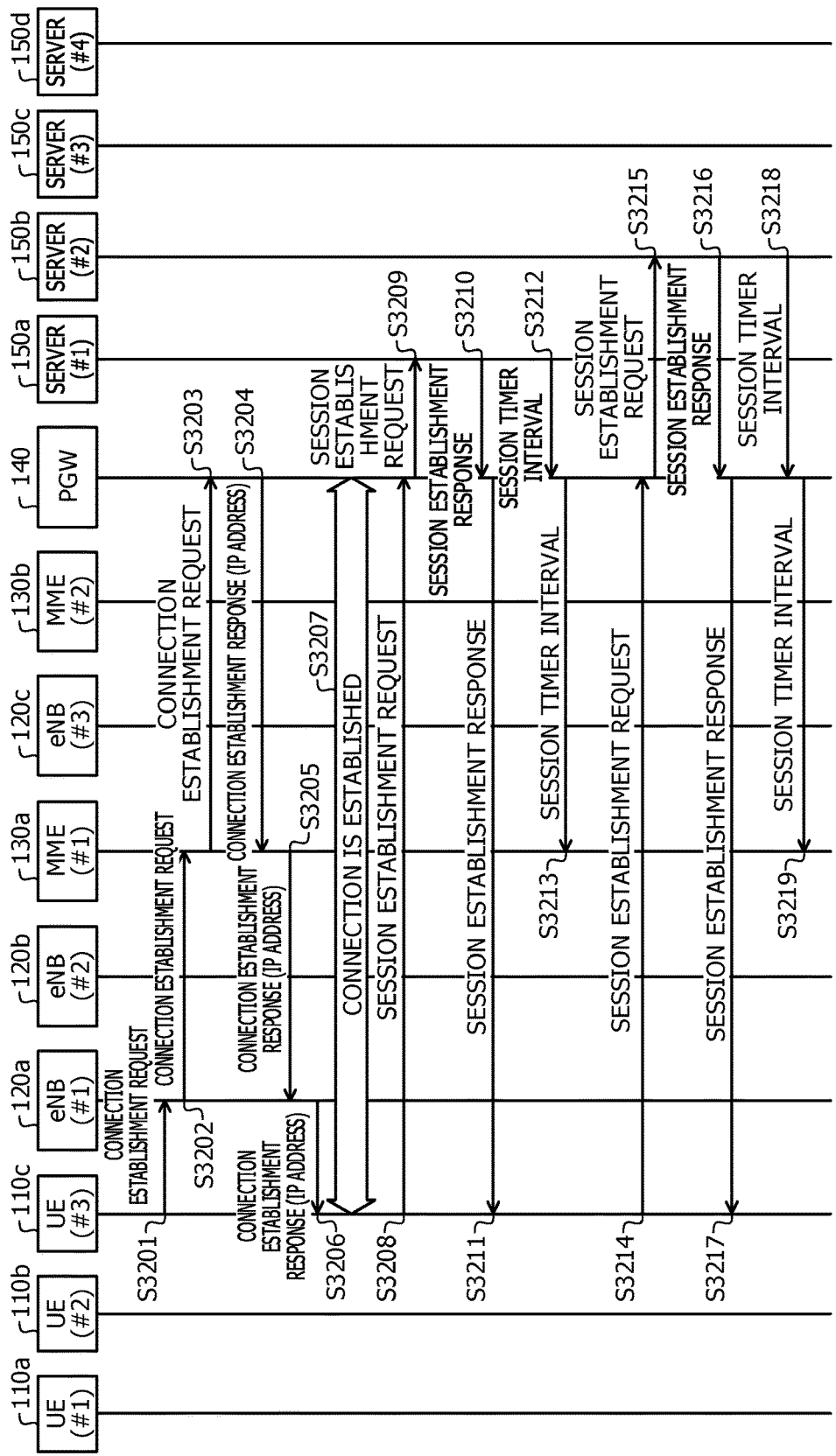
FIG. 32 is a sequence diagram (the first one) illustrating one example of first processing in the wireless communication system according to the embodiment.
Figure 33:
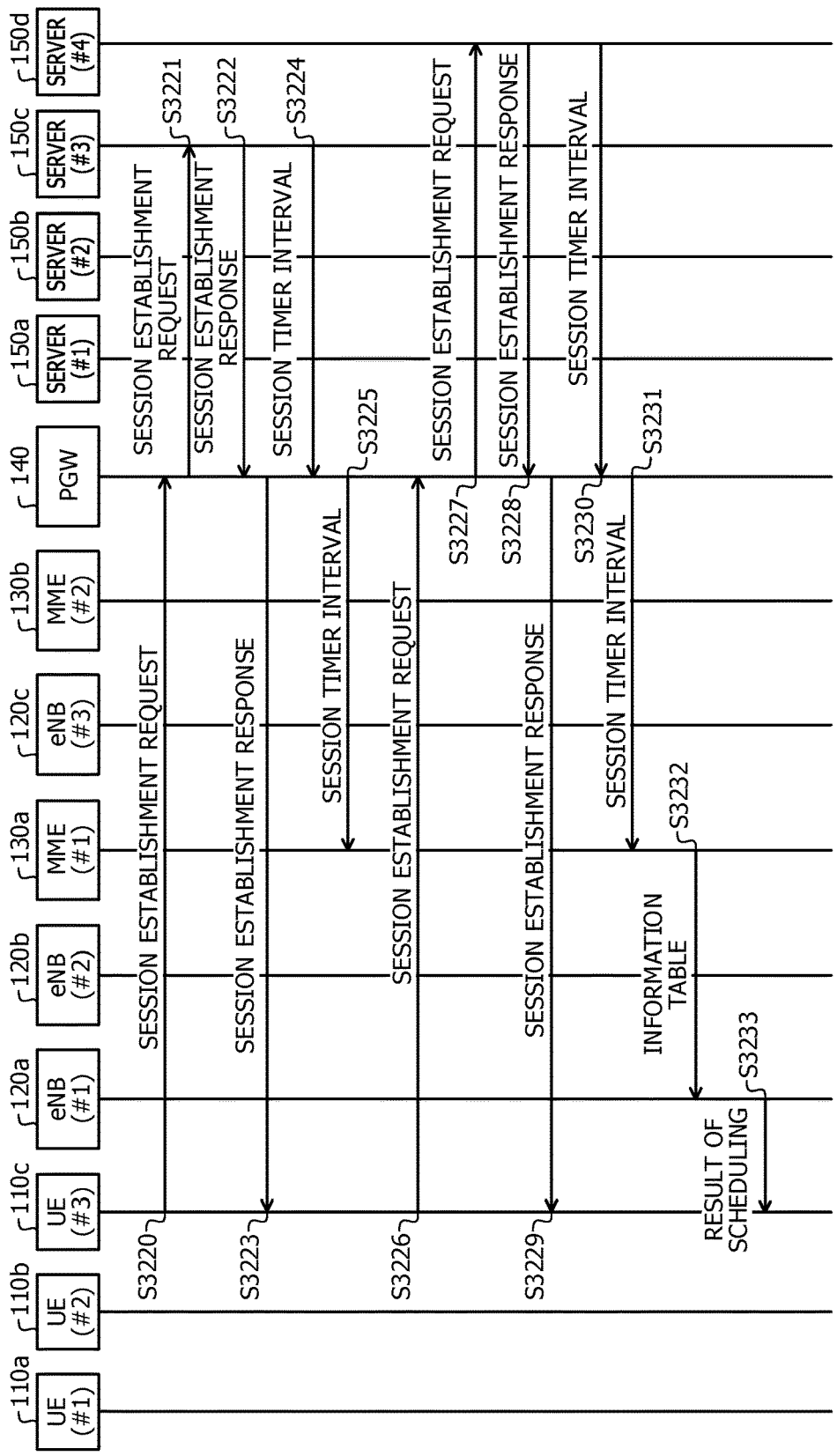
FIG. 33 is a sequence diagram (the second one) illustrating one example of the first processing in the wireless communication system according to the embodiment.

First Processing in the Wireless Communication System According to the Embodiment FIGS. 32 and 33 are sequence diagrams, each illustrating one example of first processing in the wireless communication system according to the embodiment. In the wireless communication system 100 that is illustrated in FIG. 26, for example, each step that is illustrated in FIGS. 32 and 33 is performed.

Referring to FIGS. 32 and 33, processing is described in which the UE 110c (UE #3) makes a connection to the eNB 120a, and makes a connection to the servers 150a to 150d through the eNB 120a. Various pieces of setting information that are illustrated in FIGS. 27 to 31 are made to be stored in each of the UE 110a, the UE 110b, the eNBs 120a and 120b, and the MME 130a.

First, as illustrated in FIG. 32, the UE 110*c* transmits a connection establishment request that is a request for establishment of a connection between the UE 110*c* itself and the PGW 140, to the eNB 120*a* (Step S3201). Next, the eNB 120*a* transmits the connection establishment request from the UE 110*c* to the MME 130*a* (Step S3202). Next, the MME 130*a* transmits the connection establishment request from the eNB 120*a* to the PGW 140 (Step S3203).

Next, the PGW 140 transmits a connection establishment response to the connection establishment request to the MME 130*a* (Step S3204). Furthermore, the PGW 140 allocates an IP address to the UE 110*c*, and stores the IP address allocated to the UE 110*c* in the connection establishment response that is transmitted in Step S3204. Furthermore, the PGW 140 stores information indicating the IP address of the UE 110*c* or information indicating the MME 130*a* (MME #1) that is a connection destination of the UE 110*c*, as information relating to the UE 110*c*, in the PGW 140 itself.

Next, the MME 130*a* transmits the connection establishment response from the PGW 140 to the eNB 120*a* (Step S3205). Next, the eNB 120*a* transmits the connection establishment response from the MME 130*a* to the UE 110*c* (Step S3206). Accordingly, a connection between the UE 110*c* and the PGW 140 is established (Step S3207).

Next, the UE 110*c* is made to transmit a session establishment request that is a request for establishment of a session between the UE 110*c* itself and the server 150*a*, to the PGW 140 through the eNB 120*a* (Step S3208). Next, the PGW 140 transmits the session establishment request from the UE 110*c* to the server 150*a* (Step S3209).

Next, the server 150*a* transmits a session establishment response to the session establishment request to the PGW 140 (Step S3210). Next, the PGW 140 transmits the session establishment response from the server 150*a* to the UE 110*c* (Step S3211). Accordingly, the session between the UE 110*c* and the server 150*a* is established.

Furthermore, the server 150*a* notifies the PGW 140 of the session timer interval (the actual timer value) in the session that is established between the server 150*a* itself and the UE 110*c*, in a state of being associated with the IP address of the UE 110*c* (Step S3212). The session timer interval that is notified in Step S3212, for example, is three seconds.

Next, the PGW 140 notifies the MME 130*a* of the session timer interval that is notified from the server 150*a*, in a state of being associated with an identifier (ID: 1) of the server 150*a* and the IP address of the UE 110*c* (Step S3213). The PGW 140 can specify the MME 130*a* that is the connection destination of the UE 110*c* from the IP address of the UE 110*c*.

Next, the UE 110*c* is made to transmit a session establishment request that is a request for establishment of a session between the UE 110*c* itself and the server 150*b*, to the PGW 140 through the eNB 120*a* (Step S3214). Next, the PGW 140 transmits the session establishment request from the UE 110*c* to the server 150*b* (Step S3215).

Next, the server 150*b* transmits the session establishment response to the session establishment request to the PGW 140 (Step S3216). Next, the PGW 140 transmits the session establishment response from the server 150*b* to the UE 110*c* (Step S3217). Accordingly, the session between the UE 110*c* and the server 150*b* is established.

Furthermore, the server 150*b* notifies the PGW 140 of the session timer interval (the actual timer value) in the session that is established between the server 150*b* itself and the UE 110*c*, in the state of being associated with the IP address of the UE 110*c* (Step S3218). The session timer interval that is notified in Step S3218, for example, is nine seconds.

Next, the PGW 140 notifies the MME 130*a* of the session timer interval that is notified from the server 150*b*, in a state of being associated with an identifier (ID: 2) of the server 150*b* and the IP address of the UE 110*c* (Step S3219). The PGW 140 can specify the MME 130*a* that is the connection destination of the UE 110*c* from the IP address of the UE 110*c*.

Next, as illustrated in FIG. 33, the UE 110*c* is made to transmit a session establishment request that is a request for establishment of a session between the UE 110*c* itself and the server 150*c*, to the PGW 140 through the eNB 120*a* (Step S3220). Next, the PGW 140 transmits the session establishment request from the UE 110*c* to the server 150*c* (Step S3221).

Next, the server 150*c* transmits the session establishment response to the session establishment request to the PGW 140 (Step S3222). Next, the PGW 140 transmits the session establishment response from the server 150*c* to the UE 110*c* (Step S3223). Accordingly, the session between the UE 110*c* and the server 150*c* is established.

Furthermore, the server 150*c* notifies the PGW 140 of the session timer interval (the actual timer value) in the session that is established between the server 150*c* itself and the UE 110*c*, in the state of being associated with the IP address of the UE 110*c* (Step S3224). The session timer interval that is notified in Step S3224, for example, is seven seconds.

Next, the PGW 140 notifies the MME 130*a* of the session timer interval that is notified from the server 150*c*, in a state of being associated with an identifier (ID: 3) of the server 150*c* and the IP address of the UE 110*c* (Step S3225). The PGW 140 can specify the MME 130*a* that is the connection destination of the UE 110*c* from the IP address of the UE 110*c*.

Next, the UE 110*c* is made to transmit a session establishment request that is a request for establishment of a session between the UE 110*c* itself and the server 150*d*, to the PGW 140 through the eNB 120*a* (Step S3226). Next, the PGW 140 transmits the session establishment request from the UE 110*c* to the server 150*d* (Step S3227).

Next, the server 150*d* transmits the session establishment response to the session establishment request to the PGW 140 (Step S3228). Next, the PGW 140 transmits the session establishment response from the server 150*d* to the UE 110*c* (Step S3229). Accordingly, the session between the UE 110*c* and the server 150*d* is established.

Furthermore, the server 150*d* notifies the PGW 140 of the session timer interval (the actual timer value) in the session that is established between the server 150*d* itself and the UE 110*c*, in the state of being associated with the IP address of the UE 110*c* (Step S3230). The session timer interval that is notified in Step S3230, for example, is twenty seconds.

Next, the PGW 140 notifies the MME 130*a* of the session timer interval that is notified from the server 150*d*, in a state of being associated with an identifier (ID: 4) of the server 150*d* and the IP address of the UE 110*c* (Step S3231). The PGW 140 can specify the MME 130*a* that is the connection destination of the UE 110*c* from the IP address of the UE 110*c*.

Next, the MME 130*a* generates the information table for the UE 110*c* based on each piece of information that is notified from the PGW 140 in Steps S3219, S3225, and S3231, and transmits the generated information table to the eNB 120*a* (Step S3232). Moreover, in Step S3232, the MME 130*a* may transmit only some of the information tables for the UE 110*c*, rather than transmit all of the information tables for the UE 110c. For example, the MME 130a may not transmit an actual timer value in the information table for the UE 110c, or information indicating the eNB that is a connection destination, or the like.

Next, the eNB 120a causes the information table for the UE 110c, which is notified from the MME 130a, to be reflected in the scheduling map of the eNB 120a, and transmits the result of the scheduling that is based on the scheduling map, to the UE 110c (Step S3233). For example, the reference point in time, the scheduling resolution, the scheduling unit, the starting block, the periodicity value, the correction value, and the report unit for every session (server) are included in the result of the scheduling that is transmitted in Step S3233.

Moreover, at this point, the case where the processing operations in Steps S3232 and S3233 are integrally performed with respect to each notification in Steps S3219, S3225, and S3231 is described. However, no limitation to this type of processing is imposed, and the processing operations in Steps S3232 and S3233 may be individually performed with respect to each notification in Steps S3219, S3225, and S3231.

Information Table for UE #3 According to the Embodiment

FIG. 34 is a diagram illustrating one example of an information table for UE #3 according to the embodiment. Based on each piece of information that is notified from the PGW 140 in Steps S3219, S3225, and S3231 which are illustrated in FIGS. 32 and 33, the MME 130a generates, for example, an information table 3400 that is illustrated in FIG. 34, as the information table for the UE 110c. Then, in Step S3232 that is illustrated in FIG. 33, the MME 130a transmits the information table 3400 as the information table for the UE 110c to the eNB 120a.

Three seconds are set as the periodicity value of the UE 110c in the information table 3400. Furthermore, in the information table 3400, three seconds are set as the actual timer value and 1 is set as the report unit for a session between the UE 110c and the server 150a (ID: 1). Furthermore, in the information table 3400, nine seconds are set as the actual timer value and 3 is set as the report unit for a session between the UE 110c and the server 150b (ID: 2).

Furthermore, in the information table 3400, seven seconds are set as the actual timer value and 2 is set as the report unit for a session between the UE 110c and the server 150c (ID: 3). Furthermore, in the information table 3400, twenty seconds are set as the actual timer value and 6 is set as the report unit for a session between the UE 110c and the server 150d (ID: 4).

Post-Change Setting Information in MME #1 According to the Embodiment

FIG. 35 is a diagram illustrating one example of post-change setting information (the first one) in MME #1 according to the embodiment. The MME 130a generates the information table 3400 that is illustrated in FIG. 34, and thus the setting information 3100 in MME 130a (MME #1) becomes like the setting information 3100 that is illustrated in FIG. 35. That is, in addition to the information tables 3101 and 3102 that are illustrated in FIG. 31, the information table 3400 for the UE 110c that is illustrated in FIG. 34 is included in the setting information 3100.

Post-Change Setting Information in eNB #1 According to the Embodiment

FIG. 36 is a diagram illustrating one example of post-change setting information (the first one) in eNB #1 according to the embodiment. The eNB 120a causes the information table 3400 for the UE 110c, which is notified from the MME 130a, to be reflected in the scheduling map of the eNB 120a, and thus the setting information 2900 in the eNB 120a becomes like the setting information 2900 that is illustrated in FIG. 36.

"1" in the 0 plane 2901 of the scheduling map in the setting information 2900 indicates that the UE 110c (UE #3) is allocated. That is, the UE 110a and the UE 110c are mapped to the 0 plane 2901 of the scheduling map in the setting information 2900. In the example that is illustrated in FIG. 36, the UE 110c (UE #3) is allocated to the first second, the fourth second, the seventh second, the tenth second, and so forth in the 0 plane 2901 of the scheduling map in the eNB 120a.

Setting Information in UE #3 According to the Embodiment

FIG. 37 is a diagram illustrating one example of setting information in UE #3 according to the embodiment. Setting information 3700 that is illustrated in FIG. 37 indicates information that is set in the UE 110c (UE #3) based on the result of the scheduling that is transmitted from the eNB 120a in Step S3233 which is illustrated in FIG. 33. As indicated in the setting information 3700, in the UE 110c, 2015/01/01 00:00:00:000 is set as the reference point in time, one second as the scheduling resolution, sixty seconds as the scheduling unit, 0 as the starting block, and three seconds as the periodicity value. Furthermore, as indicated in the setting information 3700, in the UE 110c, the correction value of the scheduling is not set.

Furthermore, as indicated in the setting information 3700, in the UE 110c, 1 is set as the report unit in the session for the communication with the server 150a (server #1) and 3 as the report unit in the session for the communication with the server 150b (server #2). Furthermore, as indicated in the setting information 3700, in the UE 110c, 2 is set as the report unit in the session for the communication with the server 150c (server #3) and 6 as the report unit in the session for the communication with the server 150d (server #4).

Figure 38:
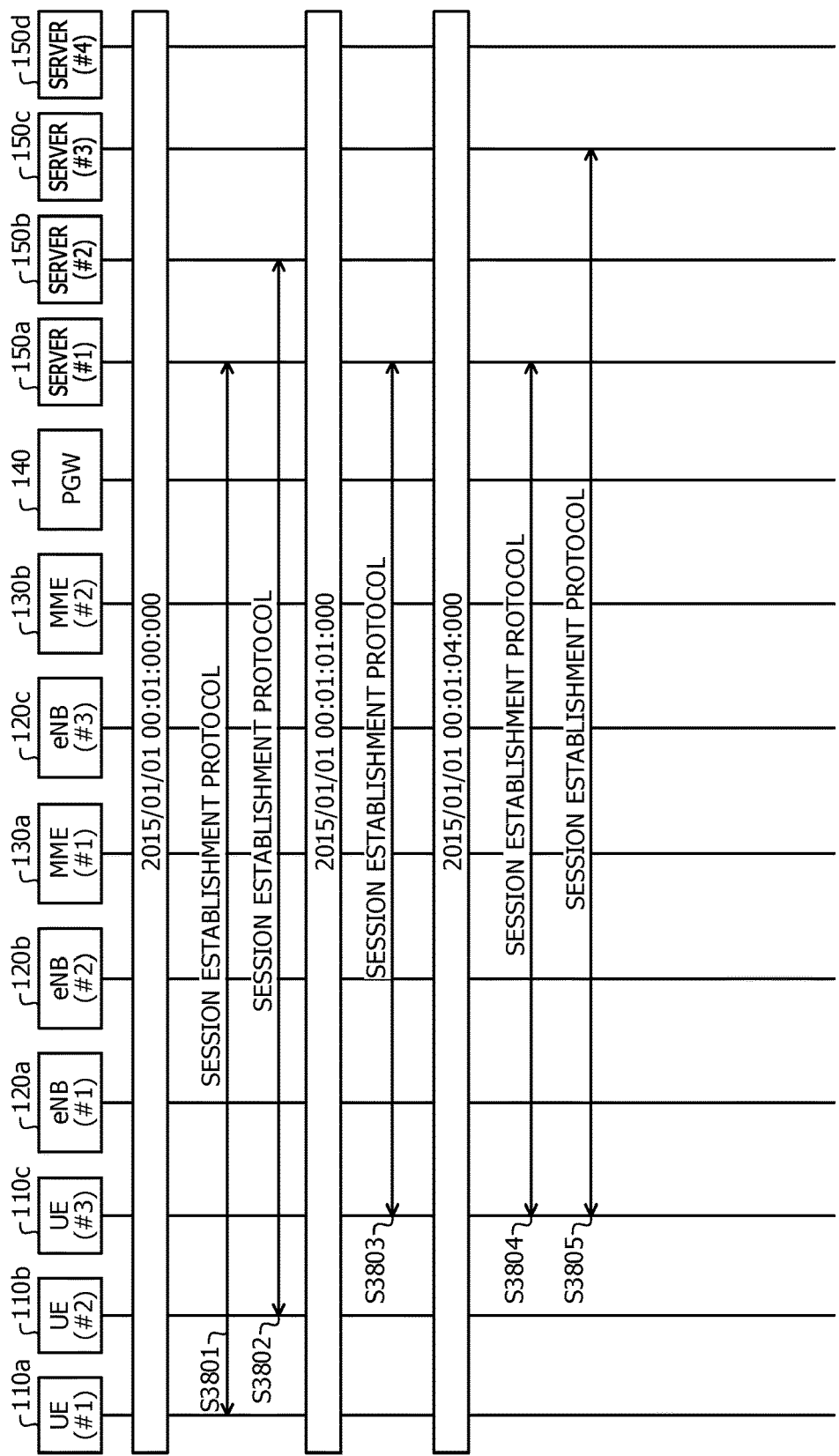
FIG. 38 is a sequence diagram illustrating one example of second processing in the wireless communication system according to the embodiment.

Second Processing in the Wireless Communication System According to the Embodiment FIG. 38 is a sequence diagram illustrating one example of second processing in the wireless communication system according to the embodiment. In the wireless communication system 100 according to the embodiment, for example, each step that is illustrated in FIG. 38 is performed after each step that is illustrated in FIGS. 32 and 33.

First, a current point in time is made to be 2015/01/01 00:01:00:000. The current point in time is the 0-th second point in time from the reference point in time that is set for the UE 110a to the UE 110c, and the UE 110a (of which the starting block is 0) and the UE 110b (the starting block is 0) are allocated to the current point in time.

For this reason, the session maintenance protocol is executed between the UE 110a and the server 150a through the eNB 120a (Step S3801). Furthermore, the session maintenance protocol is executed between the UE 110b and the server 150b through the eNB 120b (Step S3802).

Next, one second has elapsed, and the current point in time is made to be 2015/01/01 00:01:01:000. The current point in time is the first second point in time from the reference point in time that is set for the UE 110a to the UE 110c, and the UE 110c (of which the starting block is 1) is allocated to the current point in time. For this reason, the session maintenance protocol is executed between the UE 110c and the server 150a through the eNB 120a (Step S3803).

Next, three seconds have elapsed, and the current point in time is made to be 2015/01/01 00:01:04:000. The current point in time is the fourth second point in time from the reference point in time that is set for the UE 110a to the UE 110c, and the UE 110c (of which the starting block is 1 and of which the periodicity value is three seconds) is allocated to the current point in time. For this reason, the session maintenance protocol is executed between the UE 110c and the server 150a through the eNB 120a (Step S3804). Furthermore, the session maintenance protocol is executed between the UE 110c and the server 150c through the eNB 120a (Step S3805).

Figure 39:
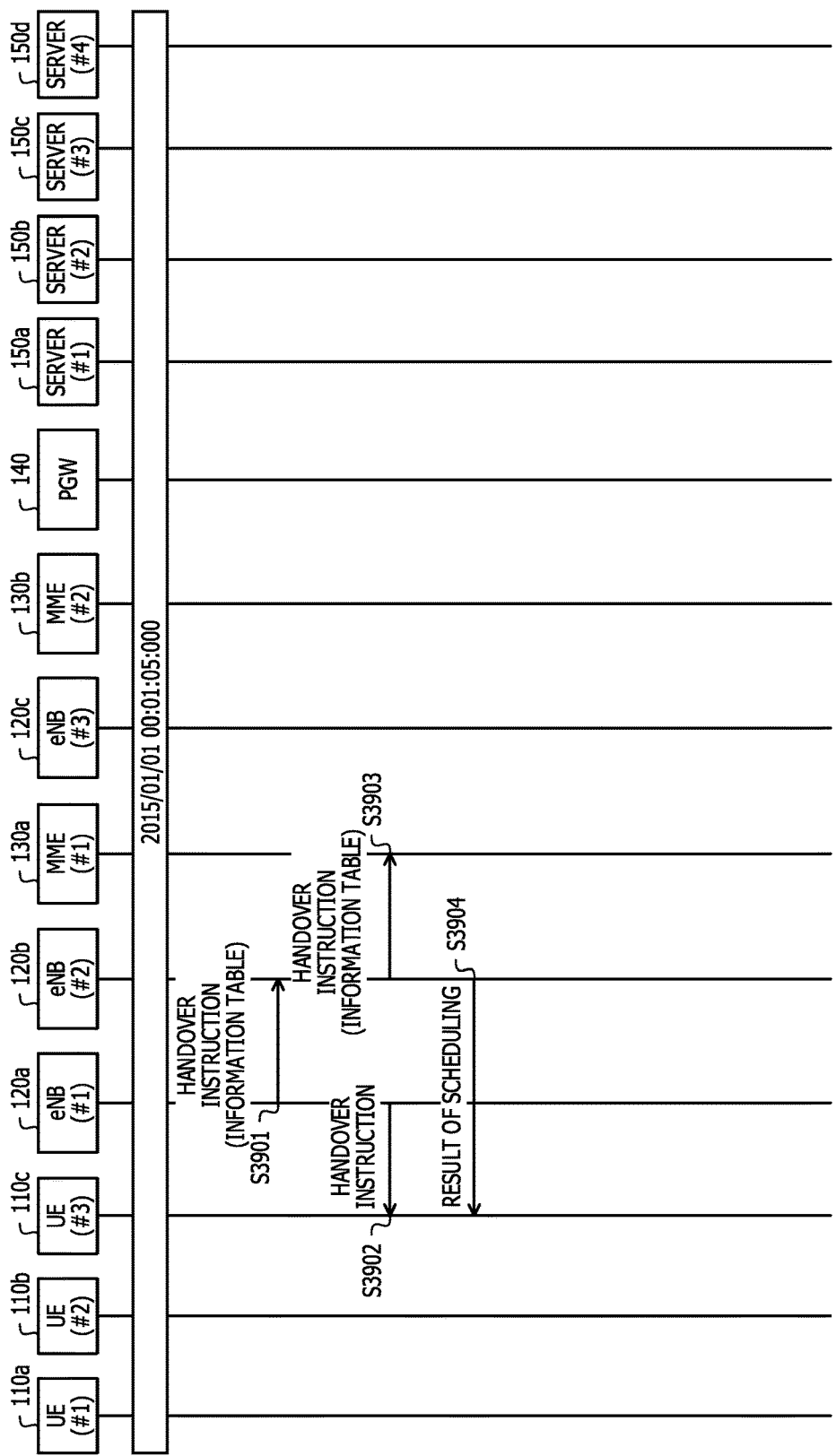
FIG. 39 is a sequence diagram illustrating one example of third processing in the wireless communication system according to the embodiment.

Third Processing in the Wireless Communication System According to the Embodiment FIG. 39 is a sequence diagram illustrating one example of third processing in the wireless communication system according to the embodiment. In the wireless communication system 100 according to the embodiment, a case is described where after each step that is illustrated in FIG. 38, at the point in time 2015/01/01 00:01:05:000, the UE 110c (UE #3) performs the X2 handover from the eNB 120a to the eNB 120b.

First, the eNB 120a that is a handover source transmits a handover instruction, which is an instruction for the UE 110c to perform the handover, to the eNB 120b that is a handover destination (Step S3901). Furthermore, the eNB 120a stores the information table (for example, the information table 3400 that is illustrated in FIG. 34) for the UE 110c that is a handover target, in the handover instruction that is transmitted in Step S3901. Furthermore, the eNB 120a transmits the handover instruction, which is the instruction for the handover to the eNB 120b, to the UE 110c (Step S3902).

Next, the eNB 120b transmits handover information indicating that the UE 110c performs the handover to the eNB 120b, to the MME 130a (Step S3903). At this time, the eNB 120b stores the information table for the UE 110c that is included in the handover instruction which is received in Step S3901, in the handover information that is transmitted in Step S3903.

Furthermore, the eNB 120b causes the information table for the UE 110c, which is included in the handover instruction that is received in Step S3901, to be reflected in the scheduling map of the eNB 120a. Then, the eNB 120b transmits the result of the scheduling that is based on the scheduling map in which the information table for the UE 110c is reflected, to the UE 110c (Step S3904).

Post-Change Setting Information in eNB #1 According to the Embodiment

FIG. 40 is a diagram illustrating one example of the post-change setting information (the second one) in eNB #1 according to the embodiment. When the information table for the UE 110c is notified to the eNB 120b in Step S3901 that is illustrated in FIG. 39, the eNB 120a, as illustrated in FIG. 40, deletes the information table for the UE 110c from the setting information 2900 of the eNB 120a. For example, the eNB 120a deletes allocation (3) of the UE 110c from the 0 plane 2901 of the scheduling map in the setting information 2900.

Post-Change Setting Information in MME #1 According to the Embodiment

FIG. 41 is a diagram illustrating one example of post-change setting information (the second one) in MME #1 according to the embodiment. Based on the handover information that is received from the eNB 120b in Step S3903 which is illustrated in FIG. 39, the MME 130a (MME #1) updates the setting information 3100 of the MME 130a as illustrated in FIG. 41. For example, the MME 130a adds the information table 3400 for the UE 110c that is included in the handover information, to the setting information 3100. Furthermore, based on the handover information, the MME 130a stores the eNB 120b (eNB #2) as the connection destination of the UE 110c.

Post-Change Setting Information in eNB #2 According to the Embodiment

Figure 42:
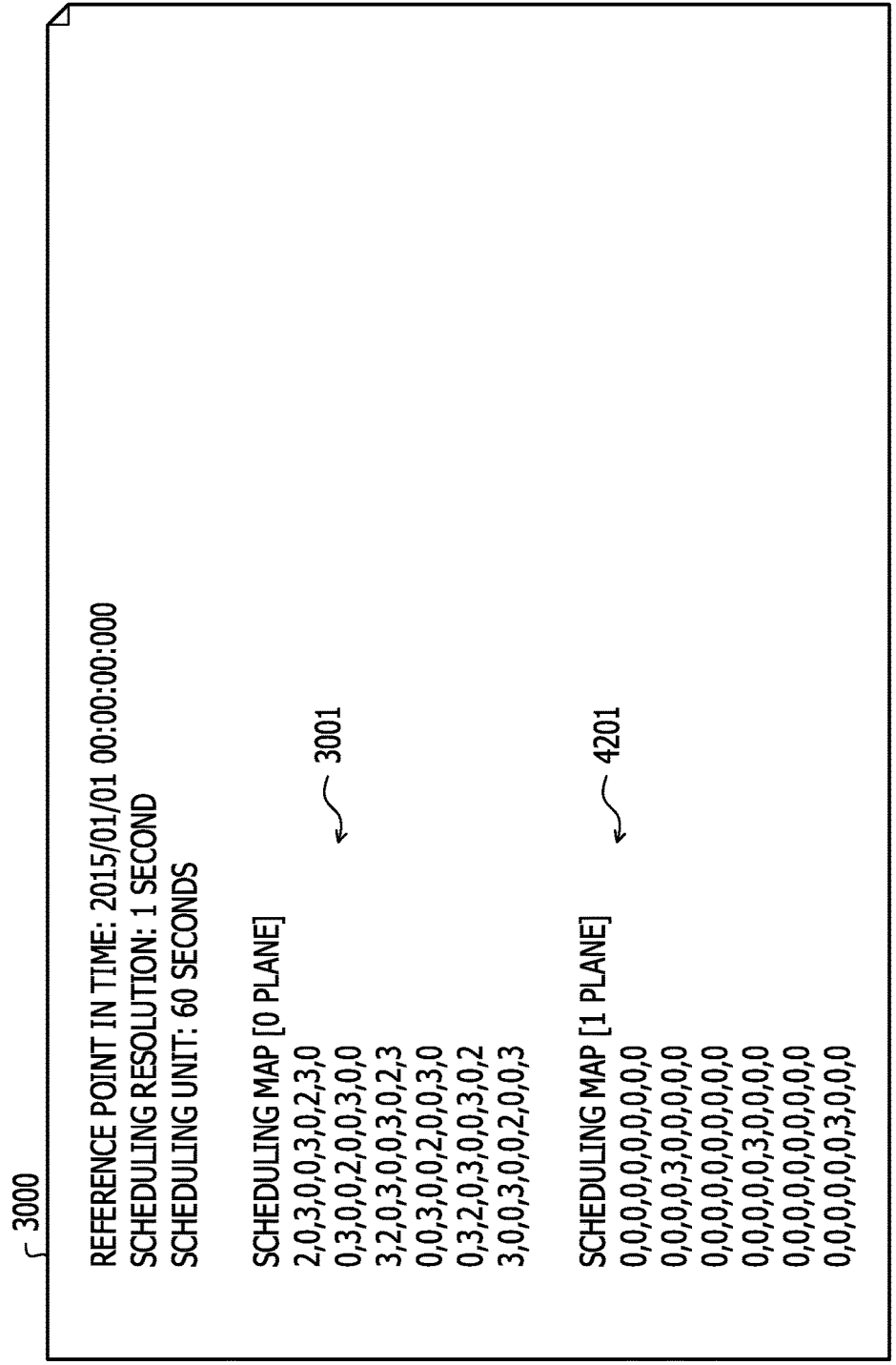
FIG. 42 is a diagram illustrating one example of post-change setting information in eNB #2 according to the embodiment.

FIG. 42 is a diagram illustrating one example of the post-change setting information in eNB #2 according to the embodiment. The eNB 120b (eNB #2) causes the information table for the UE 110c, which is included in the handover instruction that is received from the eNB 120a in Step S3901 which is illustrated in FIG. 39, to be reflected in the scheduling map in the setting information 3000.

At this time, because at the current point in time, five seconds has elapsed from the reference point in time, the eNB 120b maps the UE 110c with the starting block of the UE 110c as 2, in such a manner that the periodicity value is reached within two seconds from the current point in time. As a result, in an example that is illustrated in FIG. 42, a 1 plane 4201 is added to the scheduling map in the setting information 3000.

In Step S3904 that is illustrated in FIG. 39, the eNB 120b transmits the result of the scheduling that is based on the 0 plane 3001 and the 1 plane 4201 of the scheduling map in the setting information 3000 that is illustrated in FIG. 42, to the UE 110c.

Post-Change Setting Information in UE #3 According to the Embodiment

FIG. 43 is a diagram illustrating one example of post-change setting information (the first one) in UE #3 according to the embodiment. The setting information 3700 in the UE 110c (UE #3) becomes like the setting information 3700 that is illustrated in FIG. 43, based on the result of the scheduling that is received from the eNB 120b in Step S3904 which is illustrated in FIG. 39.

As illustrated in FIG. 43, in the UE 110c, 2015/01/01 00:00:00:000 is set as the reference point in time, one second as the scheduling resolution, sixty seconds as the scheduling unit, 2 as the starting block, and three seconds as the periodicity value. Furthermore, as indicated in the setting information 3700 in FIG. 43, in the UE 110c, the correction value of the scheduling is not set. Furthermore, information on every server in the setting information 3700 that is illustrated in FIG. 43, is the same as the setting information 3700 that is illustrated in FIG. 37.

Figure 44:
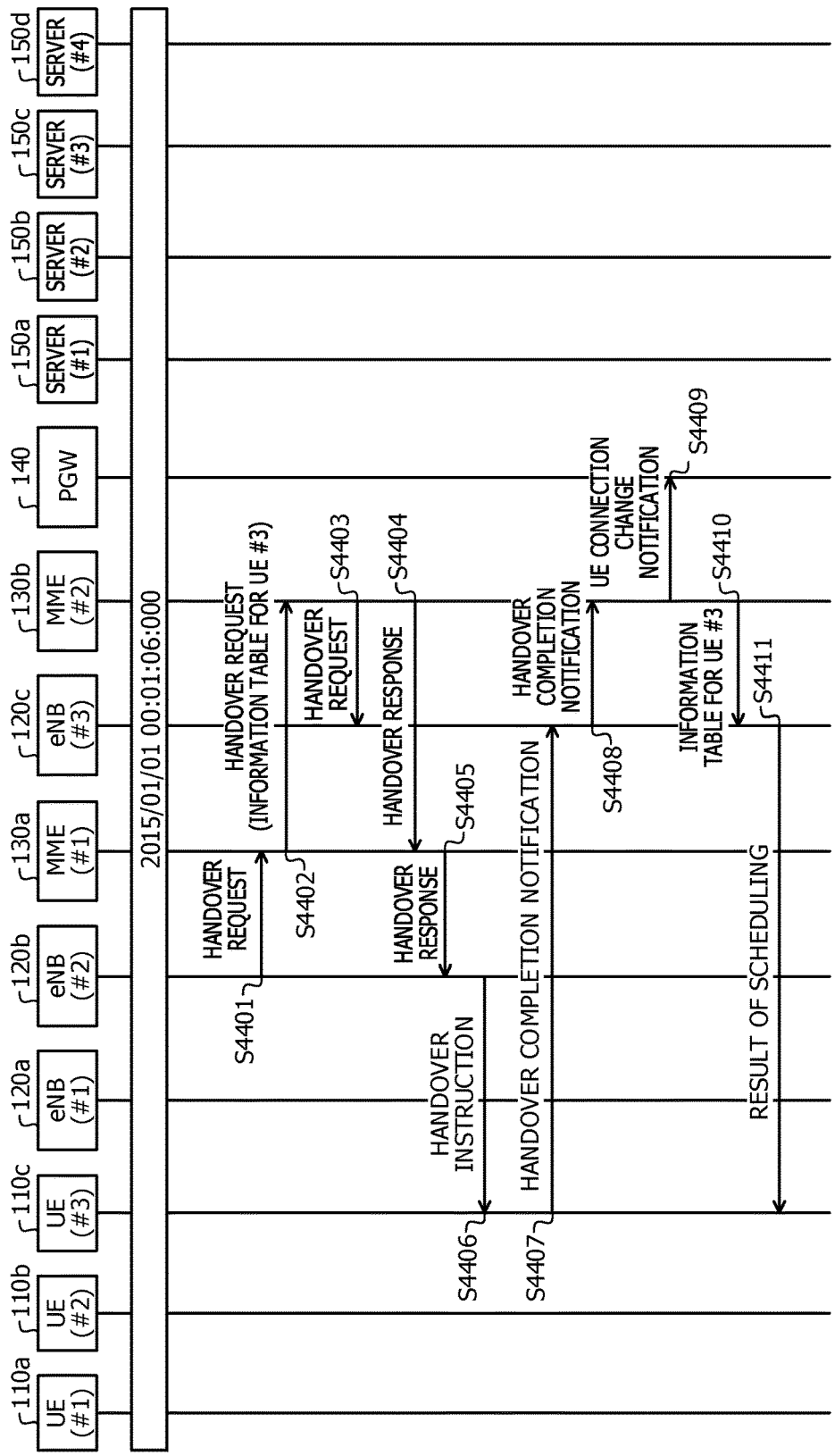
FIG. 44 is a sequence diagram illustrating one example of fourth processing in the wireless communication system according to the embodiment.

Fourth Processing in the Wireless Communication System According to the Embodiment FIG. 44 is a sequence diagram illustrating one example of fourth processing in the wireless communication system according to the embodiment. In the wireless communication system 100 according to the embodiment, a case is described where after each step that is illustrated in FIG. 39, at the point in time 2015/01/01 00:01:06:000, the UE 110c (UE #3) performs the S1 handover from the eNB 120b to the eNB 120c.

First, the eNB 120b transmits a handover request that is a request for the UE 110c to perform the handover to the eNB 120c, to the MME 130a (Step S4401). Next, the MME 130a transmits the handover request from the eNB 120b to the MME 130b (Step S4402). Furthermore, the MME 130a stores the information table for the UE 110c (UE #3) in the handover request that is transmitted in Step S4402.

Next, the MME 130b transmits the handover request from the MME 130a to the eNB 120c (Step S4403). Moreover, the information table for the UE 110c may not be included in the handover request that is transmitted in Step S4403. Furthermore, the MME 130b transmits a handover response to the handover request that is received from the MME 130a, to the MME 130a (Step S4404).

Next, the MME 130a transmits the handover response from the MME 130b to the eNB 120b (Step S4405). Furthermore, the MME 130a deletes the information table for the UE 110c from the setting information 3100 of the MME 130a. As a result, the setting information 3100 of the MME 130a is the same as the setting information 3100 that is illustrated in FIG. 31.

Next, the eNB 120b transmits a handover instruction that is an instruction for the handover to the eNB 120c, to the UE 110c (Step S4406). Furthermore, the eNB 120b deletes the UE 110c from the scheduling map of the eNB 120b. As a result, the setting information 3000 of the eNB 120b is the same as the setting information 3000 that is illustrated in FIG. 30.

Next, the UE 110c transmits a handover completion notification indicating that the handover is completed, to the eNB 120c (Step S4407). Next, the eNB 120c transmits the handover completion notification from the UE 110c, to the MME 130b (Step S4408). Next, the MME 130b transmits a UE connection changing notification indicating the connection destination of the UE 110c is changed to the MME 130b, to the PGW 140 (Step S4409). In contrast, the PGW 140 stores the IP address of the UE 110c and the MME 130b that is the connection destination of the UE 110c, in a state of being associated with each other.

Furthermore, the MME 130b transmits the information table for the UE 110c (UE #3) to the eNB 120c (Step S4410). Moreover, in a case where the information table for the UE 110c is included in the handover request that is transmitted in Step S4403, Step S4410 may be omitted.

Next, the eNB 120c causes the information table for the UE 110c, which is received from the MME 130b, to be reflected in the scheduling map of the eNB 120c. Then, the eNB 120c transmits the result of the scheduling that is based on the scheduling map in which the information table for the UE 110c is reflected, to the UE 110c (Step S4411).

Setting Information in eNB #3 According to the Embodiment

FIG. 45 is a diagram illustrating one example of setting information in eNB #3 according to the embodiment. Setting information 4500 that is illustrated in FIG. 45, for example, is information that is set for the eNB 120c (eNB #3) by notifying the information table for the UE 110c in Step S4410 that is illustrated in FIG. 44.

As indicated in the setting information 4500, in the eNB 120c, 2015/01/01 00:00:00:000 is set as the reference point in time, one second as the scheduling resolution, and sixty seconds as the scheduling unit.

Furthermore, a 0 plane 4501 of the scheduling in the eNB 120c is included in the setting information 4500. "0" in the 0 plane 4501 indicates that the UE is not allocated, and "3" in the 0 plane 4501 indicates the UE 110c (UE #3) is allocated. In the example that is illustrated in FIG. 45, the UE 110c (UE #3) is allocated to the 0-th second, the third second, the sixth second, the ninth second, and so forth in the 0 plane 4501 of the scheduling map in the eNB 120c.

Post-Change Setting Information in UE #3 According to the Embodiment

FIG. 46 is a diagram illustrating one example of post-change setting information (the second one) in UE #3 according to the embodiment. The setting information 3700 in the UE 110c (UE #3) becomes like the setting information 3700 that is illustrated in FIG. 46, based on the result of the scheduling that is received from the eNB 120c in Step S4411 which is illustrated in FIG. 44.

As illustrated in FIG. 46, in the UE 110c, 2015/01/01 00:00:00:000 is set as the reference point in time, one second as the scheduling resolution, sixty seconds as the scheduling unit, 0 as the starting block, and three seconds as the periodicity value. Furthermore, as indicated in the setting information 3700 in FIG. 46, in the UE 110c, the correction value of the scheduling is not set. Furthermore, the information on every server in the setting information 3700 that is illustrated in FIG. 46, is the same as the setting information 3700 that is illustrated in FIG. 37.

In this manner, according to the embodiment, for example, the session timer management unit 131a calculates the shortest time-out time among the time-out times (the session timer intervals) for each session that is established by the UE 110. Furthermore, based on the shortest time-out time that is calculated, the session timer management unit 131a can determine the periodicity (the periodicity value) of the allocation of the radio resource to the session maintenance signal of the UE 110. Then, based on the determined allocation periodicity, the session timer management unit 131a can adjust the transmission periodicity of the session maintenance signal by the UE 110. Accordingly, the utilization efficiency of the radio resource in the session maintenance can be improved, and the power saving for the UE (the mobile equipment) can be achieved.

In this cases, the MME 130a that has the session timer management unit 131a is the transmission periodicity adjustment device that adjusts the transmission periodicity of the session maintenance signal by the UE 110. However, the transmission periodicity adjustment device that adjusts the transmission periodicity of the session maintenance signal by the UE 110 is also possible to apply a SGW and the like among the eNB 120a, the PGW 140, the eNB 120a, and the PGW 140, without being limited to the MME 130a.

Furthermore, there is a case where multiple items of UE (for example, the UE 110a and the UE 110b) are present that establish sessions with the servers 150a to 150d through the wireless communication with the eNB 120a (the same wireless base station device). In this case, according to the embodiment, for example, based on the allocation periodicity that is determined for each of the UE 110a and the UE 110b, the scheduling control unit 121a can adjust transmission timings of the session maintenance signals of the UE 110a and the UE 110b. At this time, the scheduling control unit 121a makes an adjustment in such a manner the transmission timings of the session maintenance signals are distributed between the UE 110a and the UE 110b. Accordingly, the transmission timings of the session maintenance signals in the same wireless base station device (within the cell) can be distributed and redundant consumption of the radio resources within the cell can be suppressed. For this reason, the number of radio resources used in the same wireless base station device (within the cell) can be reduced.

In this case, the eNB 120a that has the scheduling control unit 121a is a transmission timing adjustment device that adjusts the transmission timing of the session maintenance signal by the UE 110. However, the transmission timing adjustment device that adjusts the transmission timing of the session maintenance signal by the UE 110 is also able to apply to the SGW and the like among the MME 130a, the PGW 140, and eNB 120a, and the PGW 140, without being limited to the eNB 120a.

As described above, with the wireless communication system, the transmission periodicity adjustment device, and the mobile equipment, the utilization efficiency of the radio resource in the session maintenance can be improved, and the power saving for the mobile equipment can be achieved.

For example, in the related art, the UE, such as a portable telephone, is equipped with various protocols, and the various protocols run independently without depending on other protocols. Because a radio channel between the UE and the network is established whenever the various protocols run and a channel release is performed after the various protocols stop running, this is a cause of a decrease in the utilization efficiency of the radio resource, or of an increase in power consumption in the UE or a network device.

For example, when each of the protocols runs independently for the session maintenance operation, with the timing of the session maintenance operation in each of the protocols, the frequency with which the radio channel is established increases, and a duration for which the radio channel is established becomes long. For this reason, in some cases, the utilization efficiency of the radio resource is poor and the power consumption in the UE increases.

Furthermore, in a case where multiple items of UE are present within a cell, the multiple items of UE perform the session maintenance operation in a temporally-overlapping manner, and thus the redundant consumption of the radio resources takes place temporarily only for the session maintenance. For this reason, in some cases, the number of radio resources used within the cell increases.

In contrast, according to the embodiment described above, control is performed in such a manner that the session timer for every item of UE is a multiple of the periodicity value, and thus session maintenance signals for multiple protocols are possible to integrally transmit. Therefore, the frequency with which the radio channel is established due to the session maintenance operation can be reduced, and the utilization efficiency of the radio resource in the session maintenance can be improved. For this reason, the power saving for the UE can be achieved. The power saving for the UE is achieved, and thus, in the UE, for example, the time that is available for standby, the time that is available for a telephone call, or the like can be improved.

Furthermore, according to the embodiment described above, the scheduling is performed for the session maintenance operation that is performed by each item of UE in such a manner that the timings of the session maintenance operation by each item if UE are distributed, and thus the redundant consumption of the radio resources within the cell can be suppressed. For this reason, the number of radio resources used within the cell can be reduced. The number of radio resources used within the cell is reduced, and thus, for example, the radio resource that is available for allocation for data communication by the UE and throughput can be improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A wireless communication system comprising:
a wireless terminal configured to:
establish a session between the wireless terminal and each of a plurality of servers via a wireless communication with a wireless base station, and
transmit a respective specified signal for maintaining each session using a periodic radio resource allocated to the wireless terminal; and
a control apparatus including a processor configured to:
obtain a time-out time set for each session,
determine a resource periodicity of the periodic radio resource based on a shortest time-out time from among the time-out time set for each session, and
determine a signal periodicity for transmitting each respective specified signal based on the determined resource periodicity.

2. The wireless communication system according to claim 1, wherein
each signal periodicity for transmitting each respective specified signal is determined so as to be an integer multiple of the shortest time-out time and not to exceed the time-out time set for each session.

3. The wireless communication system according to claim 1, wherein
N resource periodicities of N periodic radio resources respectively allocated to N wireless terminals are determined so as to be distributed in time direction, where N is an integer greater than 2.

4. The wireless communication system according to claim 1, wherein
the determined resource periodicity of the periodic radio resource is determined so as to be a prime number multiple of a time unit.

5. A control apparatus comprising:
a memory; and
a processor coupled to the memory and configured to:
obtain a time-out time set for each session between a wireless terminal and a plurality of servers, each session being established via a wireless communication of the wireless terminal with a wireless base station,
determine a resource periodicity of a periodic radio resource allocated to the wireless terminal based on a shortest time-out time from among the time-out time set for each session, the periodic radio resource being used for transmitting a respective specified signal for maintaining each session, and determine a signal periodicity for transmitting the respective specified signal based on the determined resource periodicity.

6. A wireless terminal comprising:

a memory; and a processor coupled to the memory and configured to:

establish a session between the wireless terminal and a plurality of servers via a wireless communication with a wireless base station, transmit a respective specified signal for maintaining each session using a periodic radio resource allocated to the wireless terminal, and receive a control signal indicating a signal periodicity for transmitting each respective specified signal, the signal periodicity being determined based on a resource periodicity of the periodic radio resource, the resource periodicity being determined based on a shortest time-out time from among the time-out time set for each session.

* * * * *